Sept. 24, 1957 J. P. TARBOX ET AL 2,807,487
BARREL KNOT TYING DEVICE
Filed Oct. 19, 1955 12 Sheets-Sheet 1

INVENTORS
JOHN P. TARBOX
JAMES H. HOLLYDAY
ATTORNEY

INVENTORS
JOHN P. TARBOX
JAMES H. HOLLYDAY
ATTORNEY

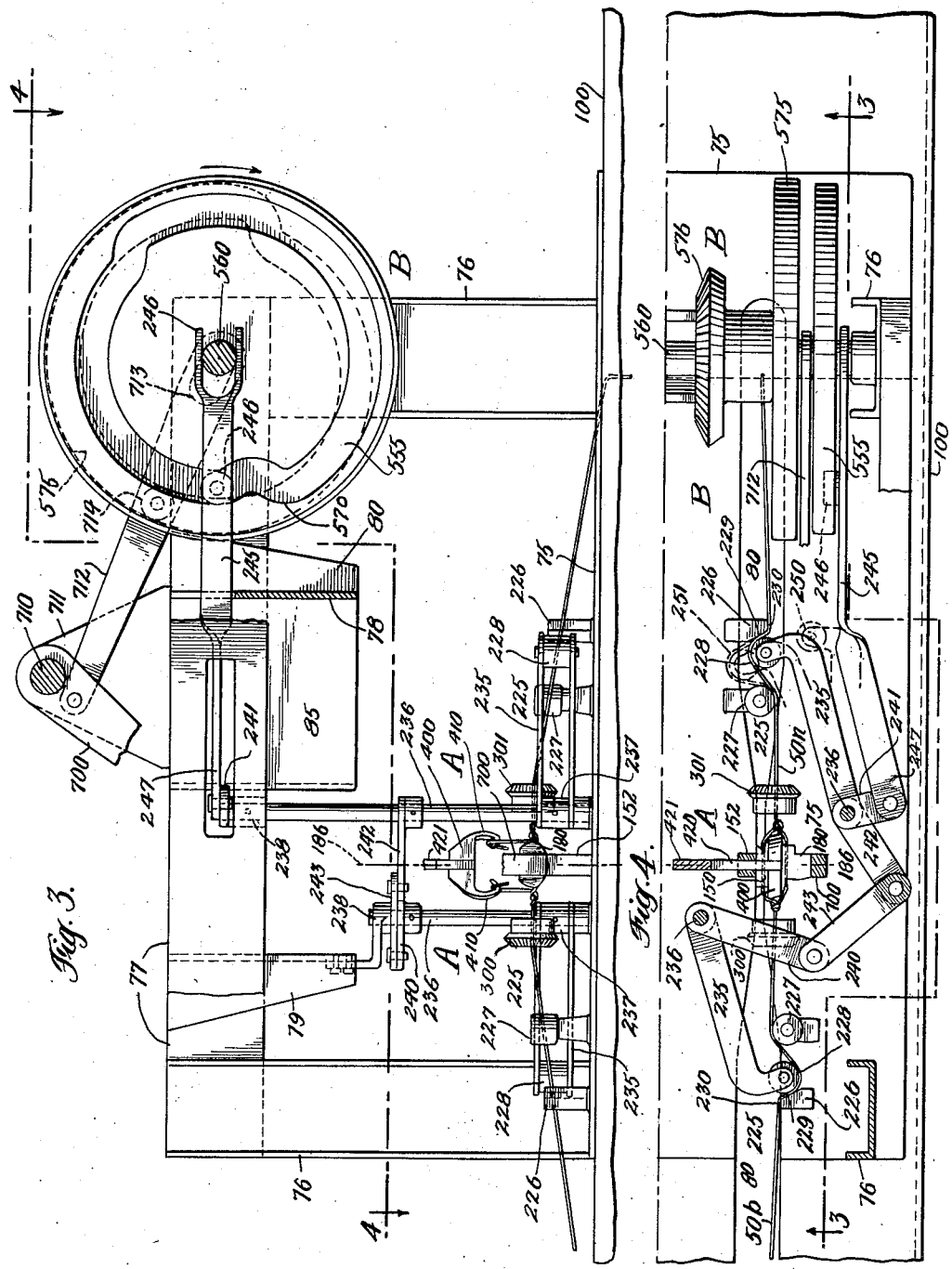

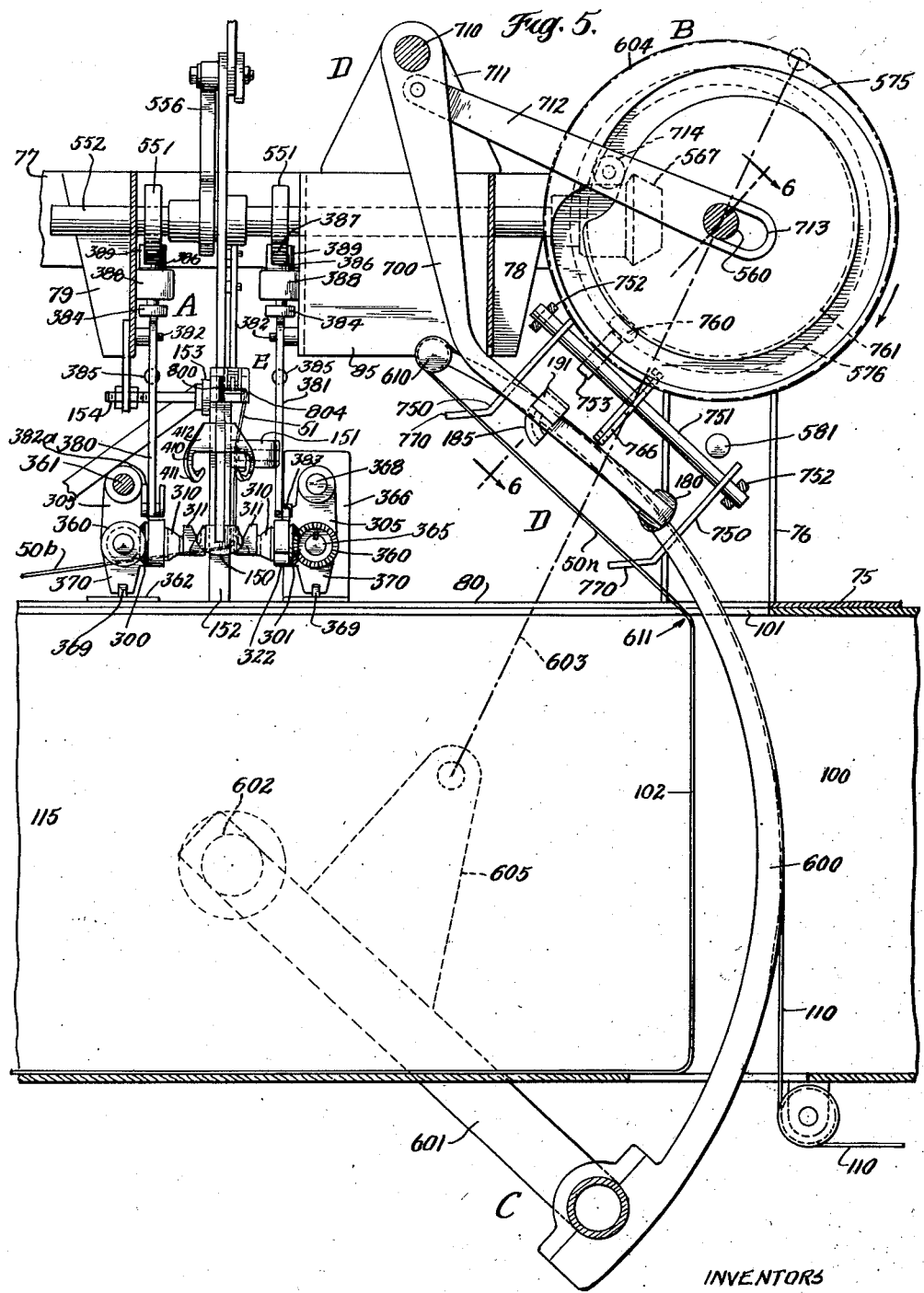

Sept. 24, 1957  J. P. TARBOX ET AL  2,807,487
BARREL KNOT TYING DEVICE
Filed Oct. 19, 1955  12 Sheets-Sheet 5

INVENTORS
JOHN P. TARBOX
JAMES H. HOLLYDAY
ATTORNEY

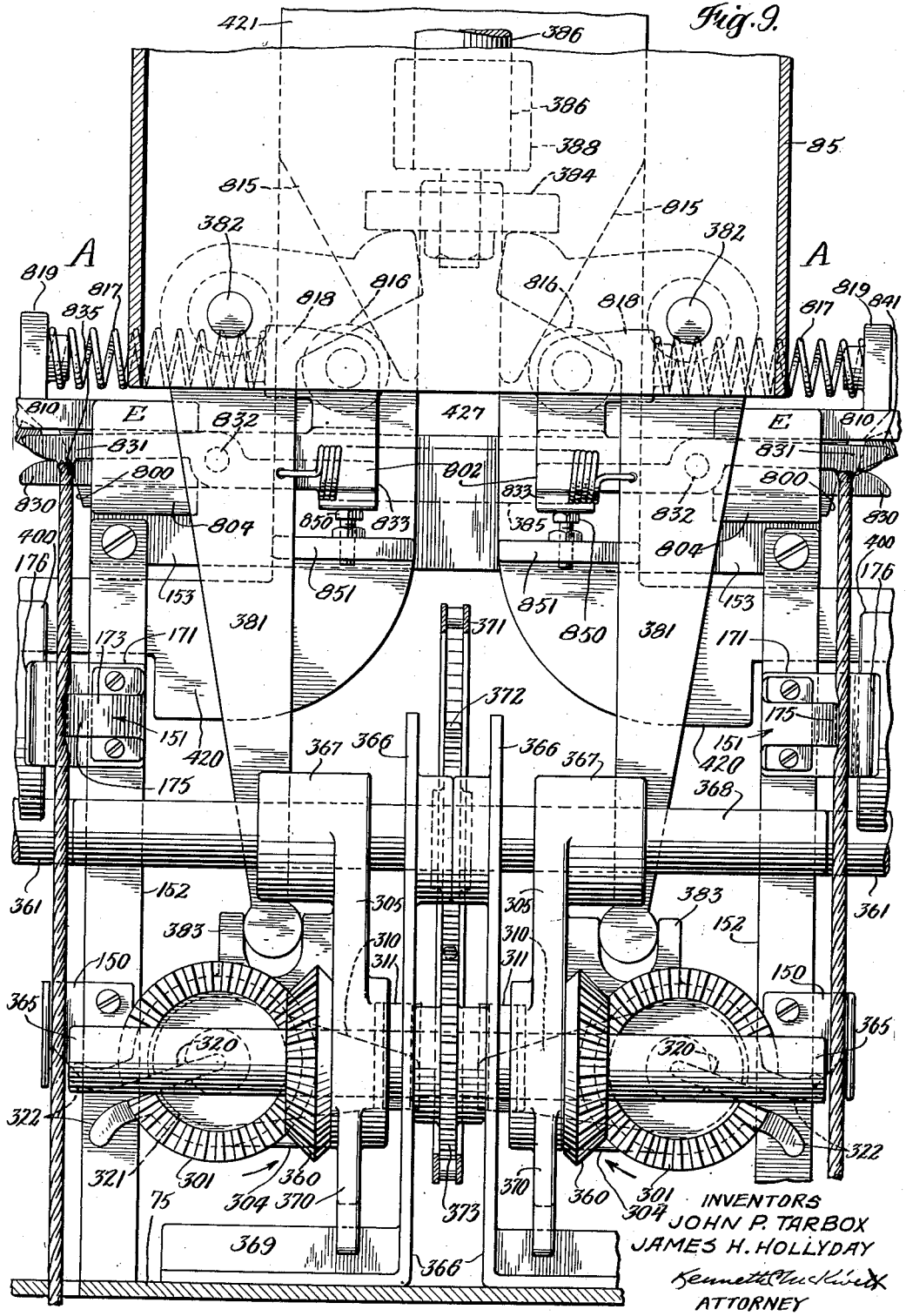

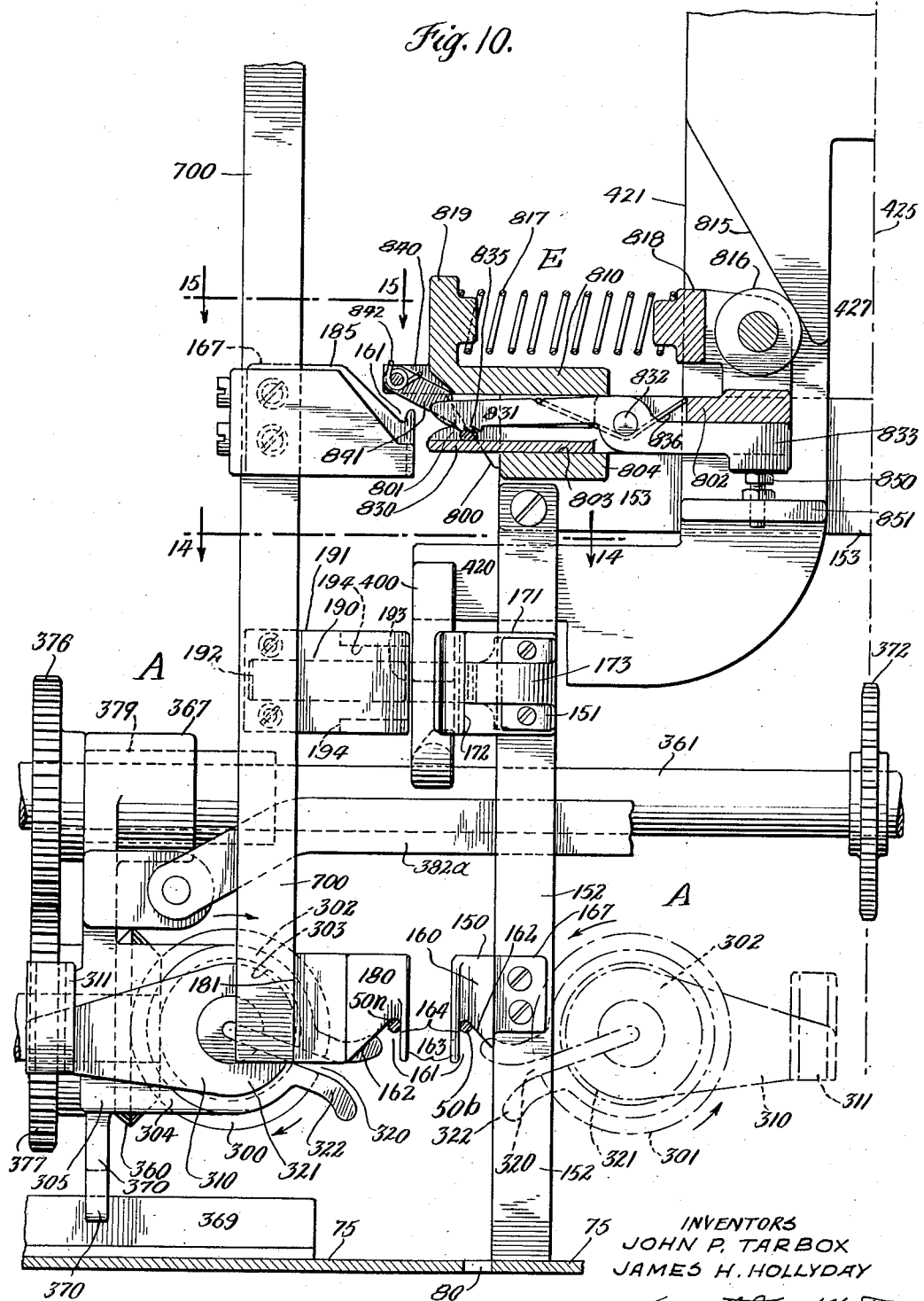

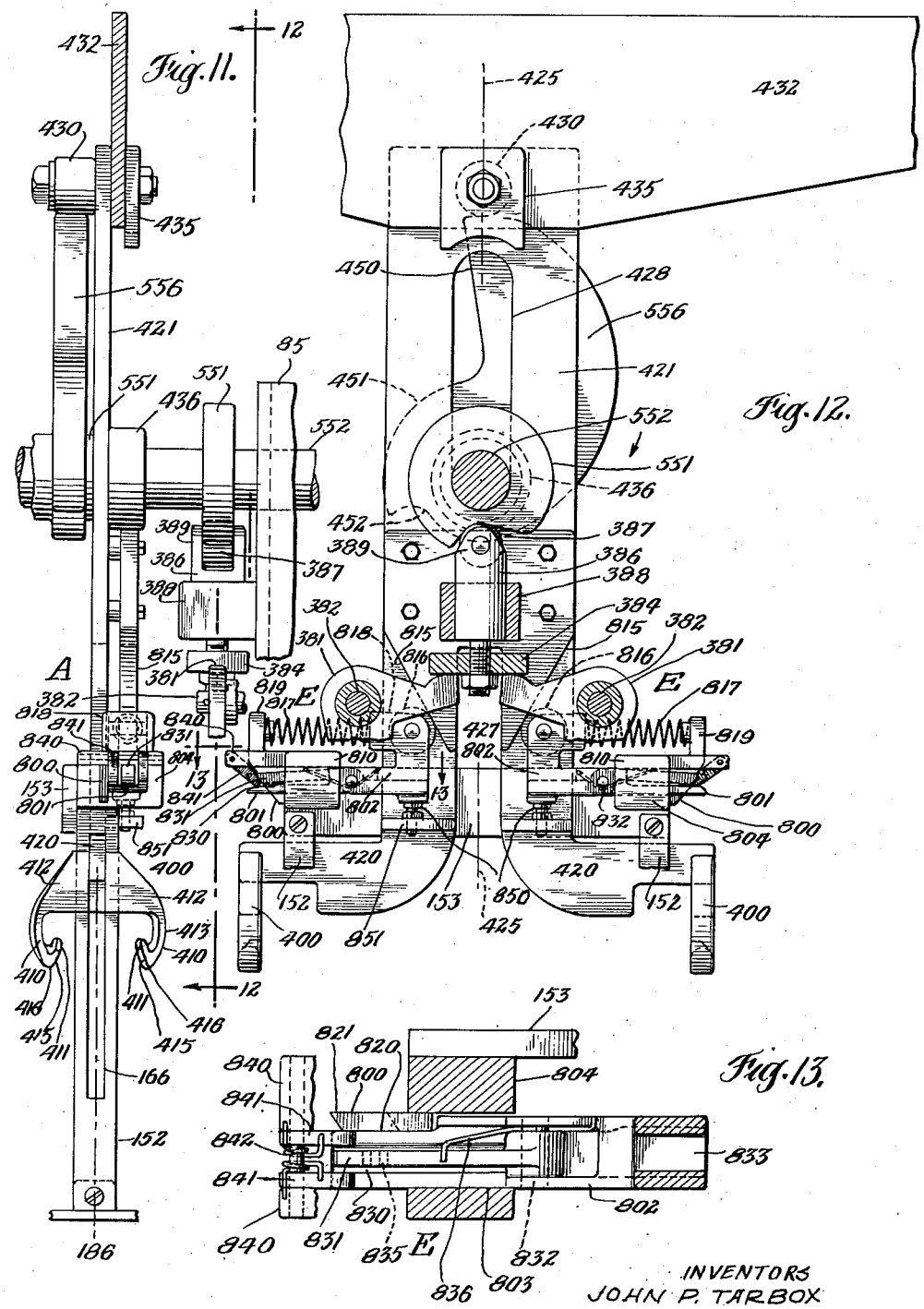

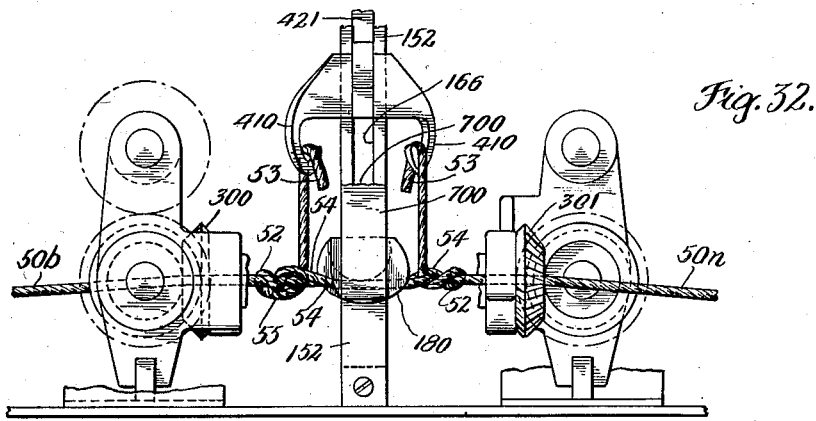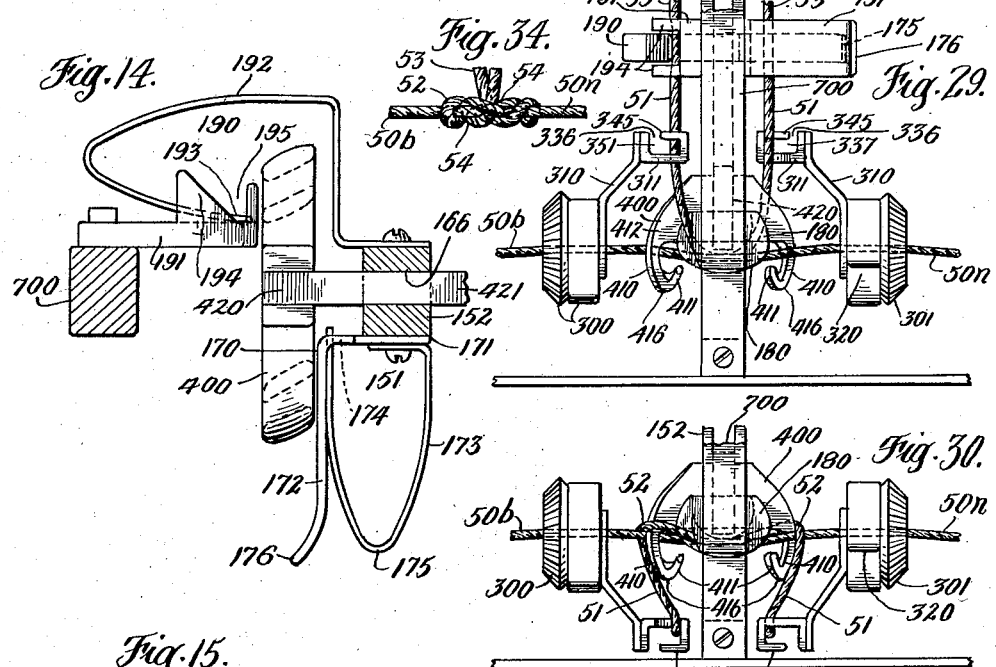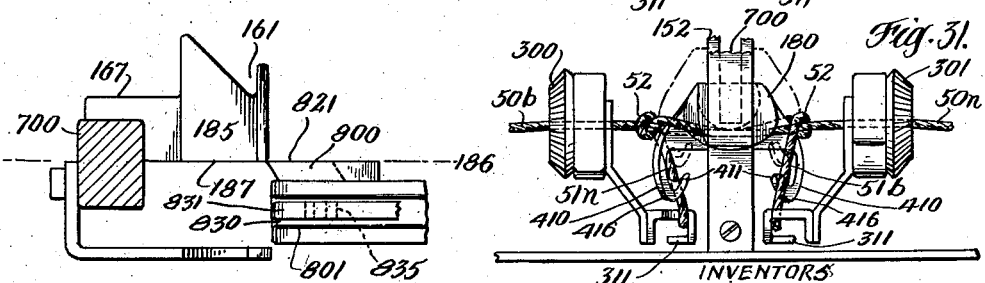

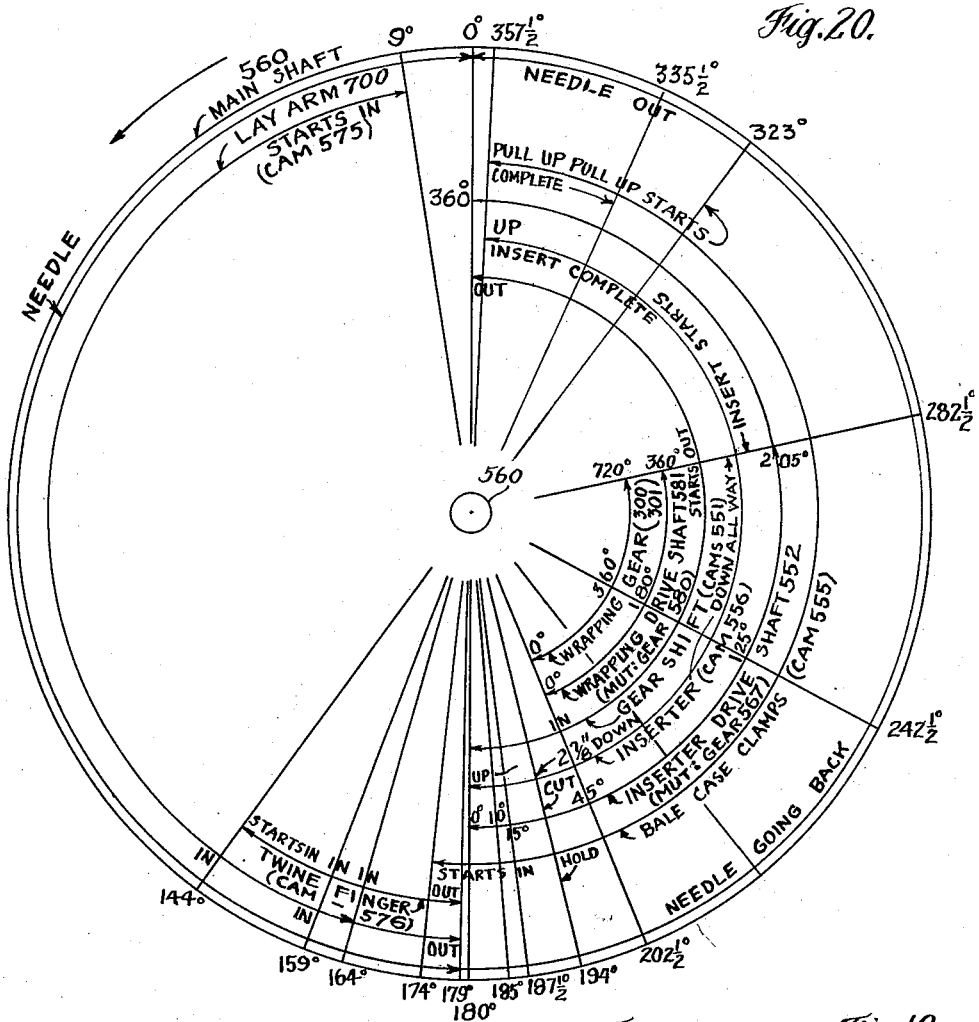
Fig. 20.
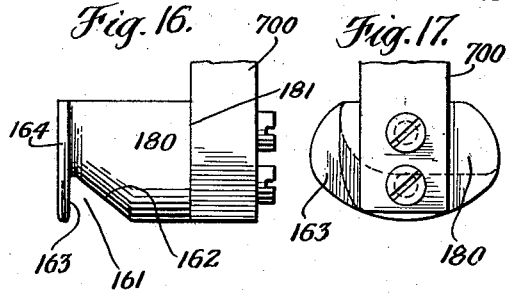
Fig. 16. Fig. 17.
Fig. 19. Fig. 18.
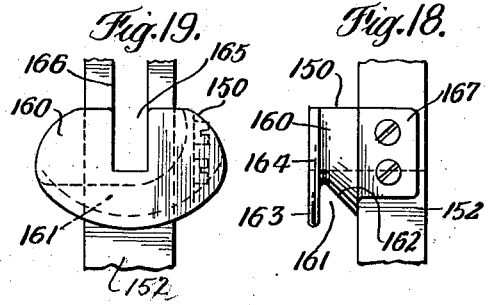
INVENTORS
JOHN P. TARBOX
JAMES H. HOLLYDAY
ATTORNEY

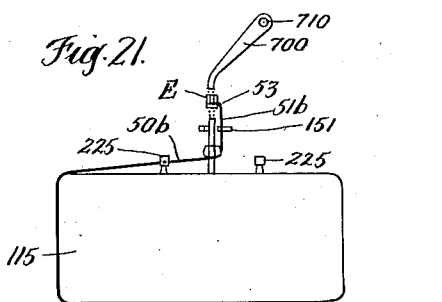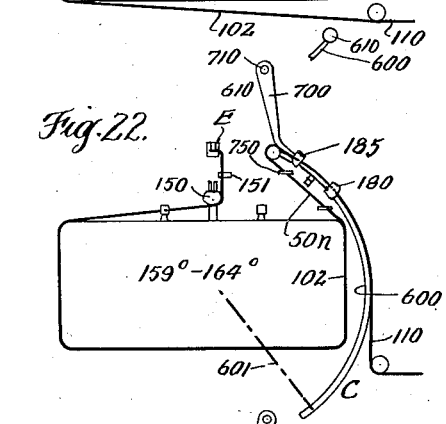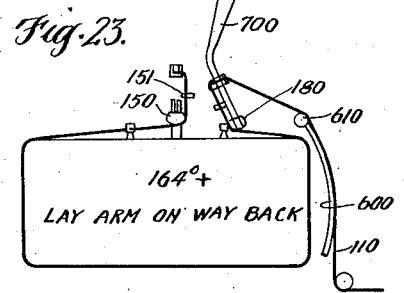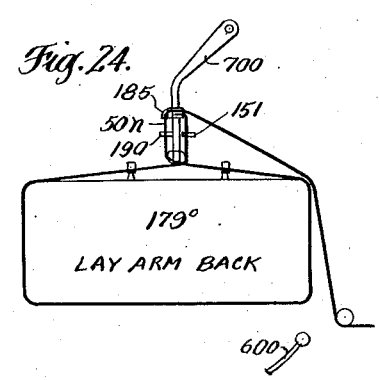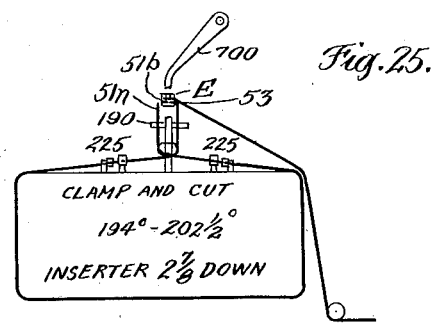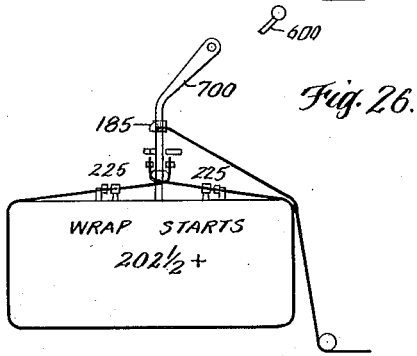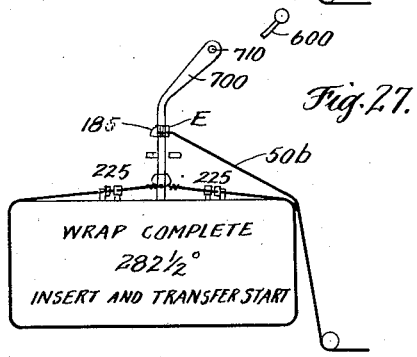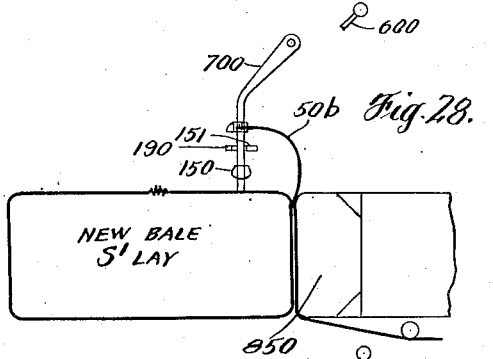

Sept. 24, 1957 J. P. TARBOX ET AL 2,807,487
BARREL KNOT TYING DEVICE
Filed Oct. 19, 1955 12 Sheets-Sheet 12
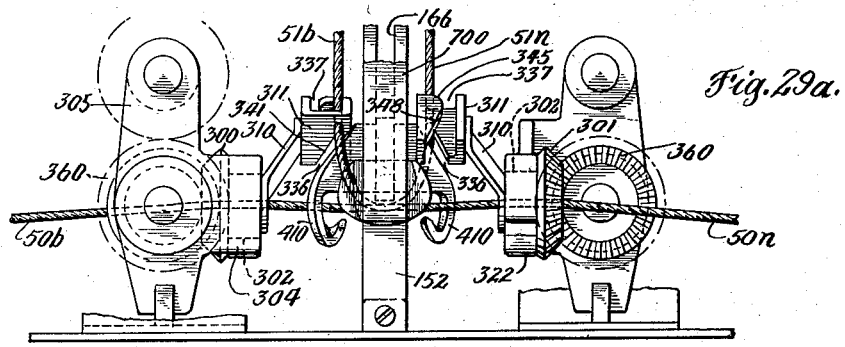
Fig. 29a.
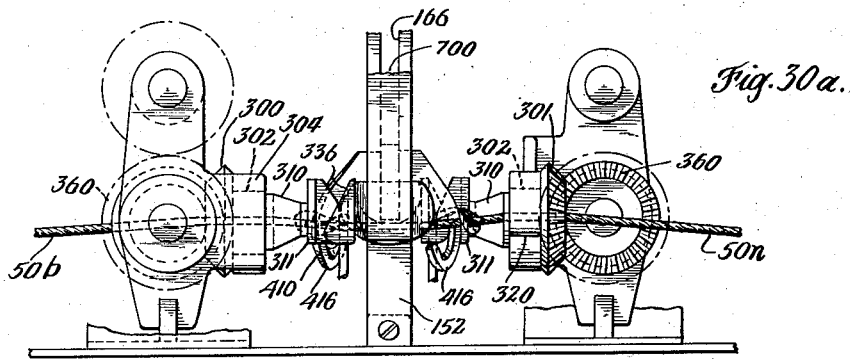
Fig. 30a.
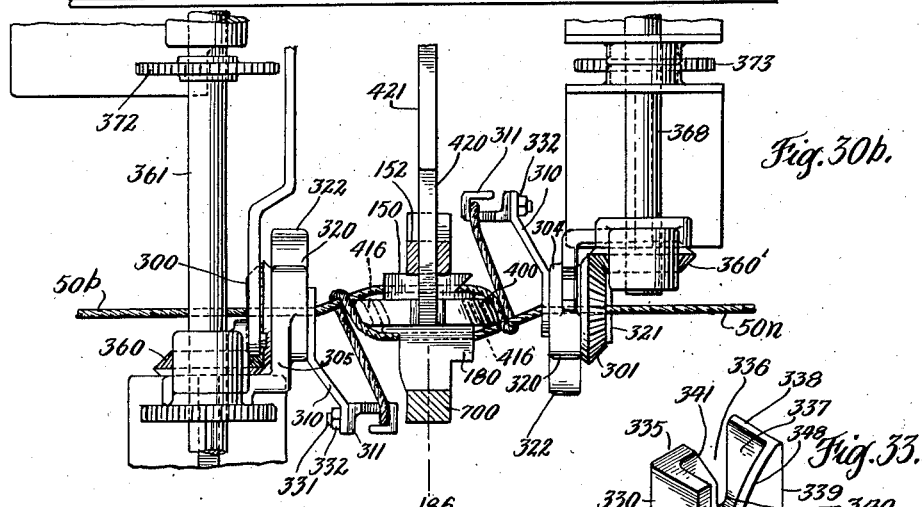
Fig. 30b.
Fig. 33.
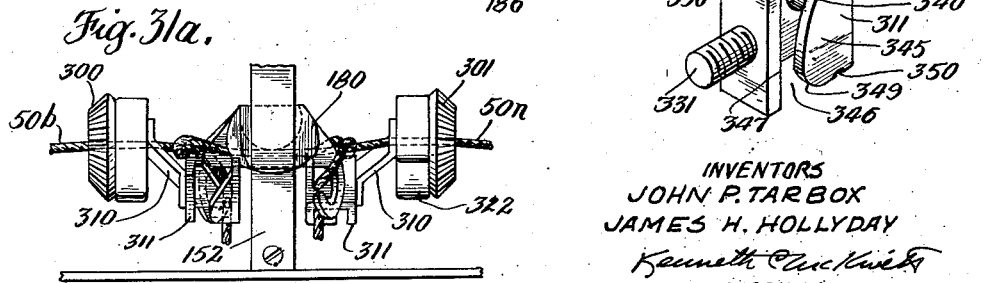
Fig. 31a.
INVENTORS
JOHN P. TARBOX
JAMES H. HOLLYDAY
ATTORNEY

United States Patent Office 2,807,487
Patented Sept. 24, 1957

2,807,487

BARREL KNOT TYING DEVICE

John P. Tarbox, Philadelphia, and James H. Hollyday, New Holland, Pa., assignors to Sperry Rand Corporation, New Holland, Pa., a corporation of Delaware Application October 19, 1955, Serial No. 541,484

29 Claims. (Cl. 289—2)

The present invention relates to tiers particularly adapted for use on hay balers. The knot tier of our invention ties barrel knots. While certain of its mechanisms or features may have applicability to the tying of other kinds of knots or perhaps to the making of certain kinds of splices, our endeavor has been to produce a mechanism outstandingly adapted for barrel knot tying.

The simplification of this type of tier with the resultant lessening of the number of parts and the number of their movements is one of the several objects we have sought to attain. Simplification of the individual parts has not been overlooked.

Another of these principal objects is an increased certainty and regularity of operation coupled with a greater ruggedness and durability.

Still another aim is the equalizing of the lengths of the free ends that are to constitute the knot at the times their lays are made, the maintaining of such equalization during the making of the knot and the attainment of equalized tensions on the free ends during the knot making. These factors have much to do with the relative regularity of the turns and perfection of the knot.

The incorporation of means to take out slack and to draw the two groups of turns toward each other and about the inserted terminal ends, and to tighten the knot are important.

Another object is the attainment of complete freedom for the completed knot to drop to the bale side.

Ready adaptation of the mechanisms employed to the tying of knots of various numbers of turns or wraps is yet another object.

The elimination of such irregularities of tier operation as are commonly caused by accumulation of or interference from dust, straws and the like has been sought.

And in connection with all of these other objects the mechanisms through which they are attained have been devised with a view to the making of ties in either twine or wire without changes of parts or the making of adjustments, or at most with a very minimum of changes or adjustment.

We have attained these principal objects by the following means, among others. Firstly, by maintaining the oppositely rotating wrapping gears free of the strands to be joined together until the lays of the strands and their free end portions have both been completed; secondly, by effecting the lays of the free end portions of both the needle strand and the bale strand by means of guides and free end holding means independently of the wrapping means, and arranging these guides and holding means symmetrically with respect to the transverse plane of symmetry of the knot but on opposite sides of the longitudinal plane of symmetry; thirdly, by combining the strand spreading function (which provides for terminal end insertion) with the strand guiding function of the laying means; fourthly, by utilizing a unitary inserter device for both the free ends reciprocated in the transverse plane of symmetry of the knot and through that reciprocation achieving the cut in that plane; fifthly, by pulling oppositely upon the main strands of the tie after the terminal ends are inserted to take up those portions of the main strands which lie between the turns and have been spread during the insertion; sixthly, by having the wrapping gear slot inclined downwardly when the gear is idle and inserting the terminal ends from the bottom of the knot upwardly; seventhly, by utilizing the wrapping gears in conjunction with the lower lay guides to hold the knot against the upward insertion drag; eighthly, providing that the knotting device be free of parts below the axis of the knot when it is completed; ninthly, by withdrawing the gears with their downwardly inclined slots from the main strands to strip the knot from the mechanism; and tenthly, by utilizing non-articulated wrapping fingers and inserter members, the twine engaging portions of which are preferably rigid or integral in form, and elsewhere in the tier wherever possible eliminating articulated members, parts likely to jam, and springs.

Other but perhaps lesser objects have been in our minds and we have attained them by the same or perhaps lesser means than those above outlined, all of which we will attempt to make known from the drawings of our tier and the accompanying detailed description which follows.

We have built and tested this tier, and these drawings depict the best forms of our invention known to us at the time of building, but it will be quite apparent upon a detailed understanding of the invention that it is capable of other embodiments both in part and as a whole. In fact other forms are already known to us and one or more of them are to be made subject of additional patent applications to cover the improvements which they embody.

Referring now to the drawings,

Figure 3 is a longitudinal section taken substantially on the line 3—3 of Figure 4 illustrating the bale case and pull-up mechanisms of the tier;

Figure 4 is a plan section of the same mechanisms taken on the line 4—4 of Figure 3;

Figure 5 is a longitudinal section taken substantially on the line 5—5 of Figure 2 showing the lay arm moved to needle loop receiving position and showing its relation to the twine finger mechanism which transfers the needle loop thereto;

Figure 9 is an enlarged transverse cross section taken on the line 9—9 of Figure 1 showing both of the inwardly located pairs of slotted drive gears of the wrapping mechanisms, the gear shifting mechanisms, and the fixed guides and free end holding clamps, all associated with the bale strands;

Figure 1:
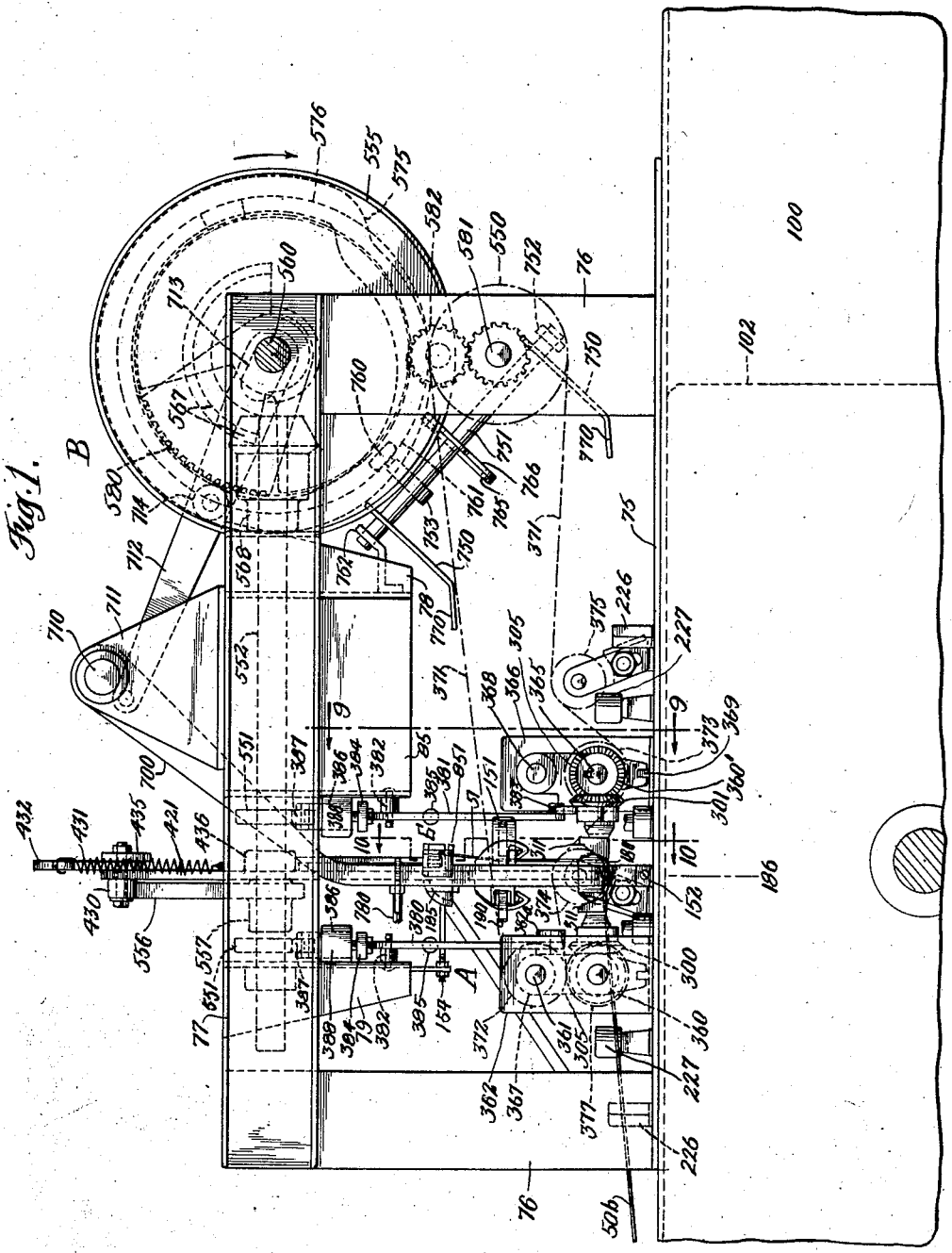
Figure 1 is a side elevation view of the tier with the parts in neutral or starting position. (The one revolution and stop clutch powering the tier and the needle yoke are omitted from this showing the better to show inwardly located parts)

Figure 10 is an enlarged transverse cross section taken on the line 10—10 of Figure 1 showing one of the outwardly located pair of slotted drive gears of the wrapping mechanisms (the relative position of the mating inwardly located drive gear being indicated in dotted lines), the associated lay arm and its twine guides, and the free end holding clamp, all appertaining to the needle strand of the tie; and also showing the holding clamp of the free end of the bale strand in vertical section;

Figure 11 is a side elevation view of the inserter mechanisms excerpted from Figure 1;

Figure 12 is a transverse cross sectional elevation of the same taken on the line 12—12 of Figure 11;

Figure 13 is an enlarged horizontal section of the bale strand end retaining clamp on the line 13—13 of Figure 12 and showing the associated cutter;

Figure 14 is a plan section of the free end holding clamps on the line 14—14 of Figure 10;

Figure 15 is a plan section on the line 15—15 of Figure 10, showing the upper needle strand guide of the lay arm and the coacting cutter blade;

Figure 16 is a detailed view of the lower guide of the needle strand as carried by the lay arm;

Figure 17 is a face view of the same looking toward the left in Figure 16;

Figure 18 is a detailed view of the lower guide of the bale strand and its support from the upright guide of the inserter mechanism;

Figure 19 is a face view of the same looking toward the right in Figure 18;

Figure 20 is an illustrative timing chart for the tier;

Figures 21 through 28 are a series of diagrams illustrating various stages of the laying of the twine for the tie, and ending with the accomplished tie;

Figures 29 and 29a; 30, 30a and 30b; 31 and 31a; and 32, are a series of correlated views illustrating the relative positions and motions of the wrapping and inserting mechanisms in the various stages of the tying of the knot.

Figure 33 is an isometric view of the wrapping finger employed in the wrapping mechanisms; and Figure 34 is the finished knot after the completion of the view of Fig. 32.

The particular barrel knot which the embodiment illustrated is adjusted and proportioned to tie is illustrated in Figure 34 as a completed knot. It is illustrated in the various stakes of its tying in Figures 29 to 32. It is a barrel knot of but one and one-half turns as can most plainly be seen by reference to Figures 32 and 34. In the several figures referred to the main strands of the bale tie are designated 50b and 50n, the free ends from which the knot is to be tied 51, their turns about the main strands 52, and their terminal ends 53, while those portions of the main strands 50b and 50n which comprise a portion of the knot per se are designated 54. The number of turns, one and one-half, can readily be counted, the half turn being designated 55 and being constituted by the return terminal end 53 which is as illustrated upwardly inserted between the coextending main strand portions 54 which enter the composition of the knot. It will also be clearly apparent that in this particular knot turns or wraps are made in opposite directions about the main strands 50b and 50n.

The method used in tying the knot and the general idea of the principal elements of the knotting mechanism can readily be apprehended from a survey of Figures 29 to 33 considered in conjunction with the knot depicted in Figure 34, and such an apprehension had in advance of a detailed description of the tier at large which follows should enable one to more rapidly follow and understand the detailed description. In setting these forth there will be used the same numerals utilized later in the detailed description but they will lack the generally consecutive order utilized in the detailed description.

In the semi-diagrammatic showing in Figures 29 to 33 inclusive, the strand guiding and holding means comprise juxtaposed and spaced apart guides 150 and 180 (see particularly Figure 30b) and above the guides spaced apart free end holding means 151 and 190 (note Figure 29) together supported by vertically extending members 700 and 152. The free end inserting means comprises the vertically reciprocable inserter hooks 410 provided with inwardly facing barbs 411 and downwardly projecting points 416, and convexly bulging main bodies 412. These are vertically reciprocable in the space between the guides 180, 150 and the holders 151, 190 by vertical reciprocation of an arm 421 to an extremity 420 of which they are attached, the arm reciprocable vertically in a slot in the support 152. Oppositely rotating wrapping gears 300, 301 are supported in frames 304 from transverse shafts 361, 368 (note Figure 30b) and are provided with bayonet slotted wrapping fingers 311 (see Figure 33) at the outer ends of the radially extending arms 310, the arms being connected with the gears through the journals 302 upon which they are revolved. Power is supplied through shafts 361 and 368 and intermediate gearing by any suitable means such as sprockets 372, 373.

Normally neither the wrapping gears 300, 301 nor their wrapping fingers 311 are engaged with the strands as they are shown in the several Figures 29 to 32. Instead, they are respectively inside and outside of the longitudinal axis of the knot as they appear in Figure 10. However, they are provided with radially extending slots 320 (as are likewise the journals, bearings and other parts in axial alignment therewith) which slots extend to the respective axes of rotation of the gears. The flaring mouths 322 of these slots, however, are in horizontal alignment with the main strands 50n and 50b which are to be joined by the knot. Thus the gears, when moved toward the strands, enter the strands in the slots and the axes of rotation of the gears may be brought into substantial coincidence with the strands 50n and 50b, whereby the gears and the associated wrapping fingers 311 may be freely rotated about the strands themselves. When so rotated the circle of revolution of the fingers 311 is arranged to intersect the vertical lines occupied by free ends 51b and 51n as guided and held by members 150, 180 and 151, 190.

Now assume that the strands 50b and 50n which are to be knotted together have been positioned as shown in Figure 29 in the guiding and holding means by any operation whatsoever as for example, a hand operation in which the end 50b is first slipped into the holder 151 (which by the way is a yielding holding means) and into the groove of guide 150, thence carried around a package or bale and brought back as strand 50n, then drawn upwardly into the groove of guide 180 and finally as a free end placed in holder 190, which is also a yielding holder. Next let us assume that the gears 300, 301 (normally removed from the strands as shown in Figure 10) are moved toward the strands until their axes of rotation lie upon or adjacent the strands as they appear in the figures. And at this time, or preferably before, let us assume that the inserter hooks 410 have been moved vertically downward to the position shown in Figure 29 in which their bulging convex sides have their region of greatest convexity in the horizontal plane of the strands to be joined. Thereupon when the gears are rotated in opposite directions, (clockwise and counter-clockwise respectively as viewed from the right) the wrapping fingers 311 respectively engage with the free ends 51 to the left and right, and the free ends are entered into the bayonet slots 337 of the fingers 311 (note Figure 33) just inside of the relatively thin finger end wall 338. So entered, in the next few degrees of rotation the free ends become bayonet locked with the fingers 311 as shown in Figure 29a, the trailing portions slipping under the overhanging upper wall 345 and into alignment with the lead portions which have slipped into the bottom 340 of the entering slot 336. The continued rotation of the wrapping gears and wrapping fingers first drags the terminal ends 53 through the holding clamps 151, 190 and as this movement progresses, slides the leading portions of the strands down over the convex bulges of the inserter hook bodies 412 into contact with strands 50b and 50n to make the first half turn of the wrap. As the wrapping fingers 311 pass beneath the strands they carry the leading portions up the outside convex shanks of the hooks 410 to initiate the next half turn, all as appears in Figure 30, for the points 416 lie inside the rotating free ends 51. At three-quarters of a turn the situation is that shown in Figure 30a, the plan view of which is given in Figure 30b. Until the terminal ends 53 are withdrawn from withholding yielding holders 151, 190 tension for the operation of wrapping is derived both from the yielding resistance of the holders and from the drag of the bayonet lock engagements of the wrapping fingers, but after the terminal ends 53 are free of the yielding holders, the tension for the wrap is supplied wholly by the fingers.

Before the rotating fingers 311 pass beneath the strands 50b and 50n a second time the inserter hooks 410 are lowered, as shown in Figures 31 and 31a, from the dotted line position initially occupied to the full line position in which the inserter point 416 instead of lying inside the reach of the free end 51 from the completed turn to the wrapping finger, lies outside of that reach, as appears in Figure 31. Therefore as the fingers 311 again pass under the strands the rotating free ends 51 pass inwardly of the barbs 411 and into position to be caught by those barbs when the inserter hooks 410 are withdrawn upwardly. Figure 32 shows these terminal ends as having been so caught and drawn through the knot to its upper side, thereby to complete the knot, with the exception of such pull up as is requisite to draw the completed turns toward each other and about the terminal ends as shown in Figure 34. Very soon after hooks 410 start their upward inserting movement, the terminal ends are of course drawn entirely through the fingers and freed of them. The wrapping gears about this time are brought to rest and withdrawn from the strands. Incident to their withdrawal the downward inclination of their strand receiving slots 320 (see Figure 10) presses the main strands 50b and 50n downwardly and as these strands leave the divergent mouths 320, the knot is stripped from guides 150, 180 and there is no obstruction whatever to prevent its free downward movement to the side of the package or bale. The knot of Figure 34 is the result.

Now barrel knots are subject to a number of modifications, for example, the turns are sometimes made in the same direction about the main strands, the ends can be inserted from the top down and are often inserted in opposite directions, the one being pulled through the one side of the knot and the other through the other side, any desired number of turns can be used (the greater number of turns the greater the strength of the knot), and the turns may be wrapped either with the twist of the twine or against it, etc. One need only appropriately change gearing, timing, parts proportioning and direction of movement, etc., to modify the barrel knot tie in such respects.

Leaving for the moment the showing of the knot per se in the various stages of its development and the semi-diagrammatic illustrations of Figures 29 to 32, a detailed examination of Figures 1 to 18 inclusive will disclose the tier at large and the several mechanisms of which it is comprised in their relations to each other, to the comprehending framework within which they are mounted, and to the baling machine in conjunction with which the tier operates.

The tier comprises five principal mechanisms. The first is the knotting mechanism A, the function of which is to tie the knot after the free ends of the strands to be tied together are presented to it. This mechanism in turn comprises five co-acting devices, means to guide and hold the ends to be tied, means (bale case clamps) to keep the tension of the tie on the main strands while the tie is being made, means to wrap the turns of the free ends about the main strands, means to insert the terminal ends of the free ends between the main strands intermediate the turns, and means to take up slack and pull up or tighten the knot after it has been made. Secondly, there is the timing mechanism B, by means of which the time relationships between the several mechanisms which constitute the tier and the various parts of those mechanisms are timed in their operational sequences, and by means of which they are powered. This mechanism is usually geared to the baler drive per se and controlled by the length of the bale being formed. Thirdly, there is the needle mechanism C, by means of which the so-called needle loop of a tier is presented for transfer to the knotting mechanism A. This needle mechanism forms its loop by drawing twine or wire from the supply bale or coil and projects this loop through the bale case whereafter it is received and held by the knotting mechanism, the needle returning to its normal position outside of the bale case. Fourthly, there is embodied the lay mechanism D, a mechanism intermediary between the needle mechanism C and the knotting mechanism A. This lay mechanism D comprises a strand laying device which carries the so-called needle strand of the loop into tying position, and the needle strand transfer or twine finger device which shifts the needle strand from the needle to the transfer device. Fifthly, there enters the free end cut-off and transfer mechanism E, the functions of which are to sever the needle loop at its bight thereby rendering the needle strand free end available to the knot, and to retain and transfer the other side of the needle loop to such position as to properly enter the next succeeding tie.

The frame of the tier which mounts all of these mechanisms except the needle mechanism C, is comprised of a base designated generally 75, four longitudinally and transversely spaced uprights 76 in rectangular arrangement, two frame side members 77 which interconnect the two longitudinally spaced pairs of uprights 76, and several transversely extending frame members 78, 79 which interconnect the longitudinally extending members 77 at appropriate points. The base 75 is in the form of a metal plate of appropriate gauge and reinforcement (not shown) to give it adequate transverse and longitudinal stiffness sufficient to make the frame self contained and rigid enough to support the several mechanisms which it mounts in appropriate operative relationships without necessarily depending upon the underlying bale case upon which it is secured. The verticals and longitudinals of the frame are shown as channels in cross section and both they and the transverse members 78, 79, are given such form and dimension as will afford the necessary strength and rigidity. The various members may be secured together by that means deemed most desirable, such as bolting, riveting, or welding depending upon the circumstances surrounding the particular jointure. The base 75, further is provided with slots 80, in general coextensive with and open and free in the same regions as are the commonly known bale case slots which they are intended to overlie.

Figure 2:
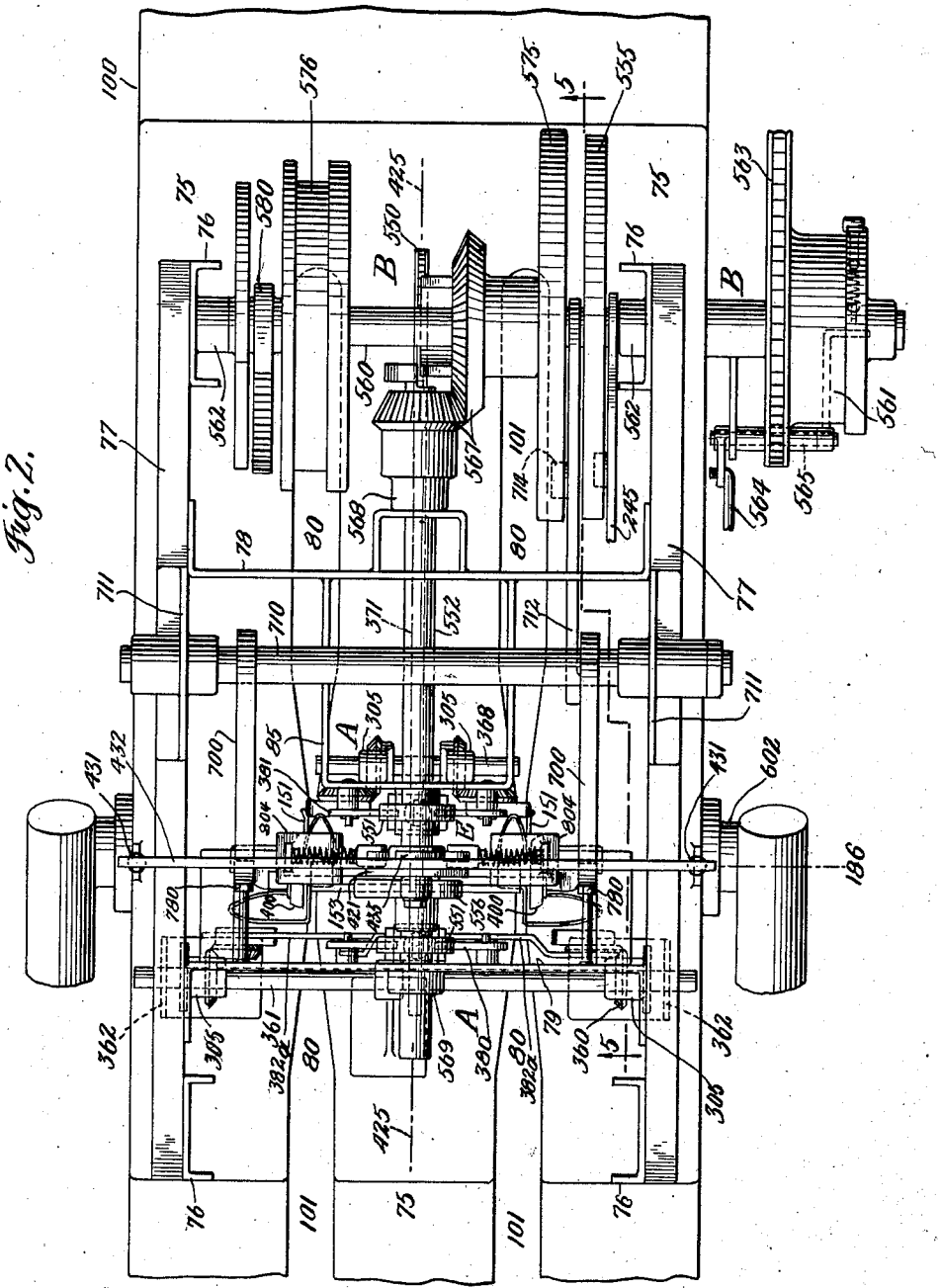
Figure 2 is a plan view. The bale case clamp and the pull up devices are omitted from Figures 1 and 2 for the sake of clarity, but are shown in Figures 3 and 4; the clutch and needle yoke are shown in the plan.

The bale case is designated 100, the bale case slots 101 (see especially Figs. 2 and 5, and the dotted outline of the bale in process, 102, as it appears in Figs. 1 and 5).

Once the main strands and their free ends are presented to the knotting mechanism in the proper relationship, irrespective of the means by which they are presented, the knotting mechanism per se is self-sufficient to achieve the tie. Our tier embodies two such mechanisms, being a duplex tier arranged to simultaneously effect two ties per bale. In the main our description will cover but the mechanisms connected with a single tie, but it applies to both. The knotting mechanism embodies first of all a lower guide 150 and a holder 151 for the free end 51 of the bale strand 50b (see Figs. 1, 2, 5 and 10, especially the latter). Both guide 150 and holder 151 are secured to a vertically extending upright 152 whose lower end is anchored to the central portion of base plate 75 adjoining slot 80 and whose upper end is secured to a transverse brace 153. This brace transversely interconnects with vertical uprights 152 of the two knotting mechanisms A embodied in each tier. The member 153 is transversely stabilized by suitable connections 154 to the transversely extending main frame member but these are omitted for the sake of clarity of showings.

Guides 150 are shown in greatest detail in Figs. 10, 18 and 19. They comprise main bodies 160 provided with the flanged groove 161 to receive the bale strand 50b and its free end. This groove extends curvilinearly from the upper side of the main body 150 on that end of the guide which lies toward the needle mechanism C downwardly to merge into a lower substantially horizontally extending portion as most clearly appears in Figs. 18 and 19. The side 162 of the groove which lies away from the bale slot 80 is inclined sufficiently to slide a strand entered into the groove toward the vertical plane of bale slot 80 where it encounters the guide flange 163 which stops it at the bottom of groove 161 and causes it to lie but flange thickness away from the inner face 164 of the guide and substantially in the vertical plane of bale slot 80. The main body 160 is generally of elliptical shape and its major diameter is arranged transversely of the supporting upright 152. Its dimensions are such that its opposite ends project substantially equidistantly from the front and rear upright 152. The main body is transversely slotted as at 165 complementally to a transverse slot 166 in upright 152 designed to accommodate the operating member of the intersecting device presently to be described. Securement of the guide to upright 152 is by means of a transversely extended ear 167 integral with the main body and appropriate machine screws.

The free end holder 151 is located some inches above the guide 150 and is comprised (as will be seen by reference to Figs. 10 and 14 for detail) of an angle member 170 whose short arm 171 is secured to the needle side of upright 152 and whose long arm 172 is projected toward the needle mechanism and flared outwardly of the bale case, together with a bow spring 173 having an inturned end secured in common with angle member 170 to upright 152 and its opposite end projected through a slot 174 in the short arm 171 of angle member 170, the bight 175 of the bow spring tapering in form in such manner as to diverge from the outwardly flared end 176 of arm 172. Thus a free end of a bale strand may be drawn between arm 172 and bow spring 173 after entering the divergence of 175, 176 and held between the arm and the spring at the apex of the angle, where substantially parallel portions of the arm and the spring engage it upon opposite sides. It is yieldingly so held, and so resists drag tending to draw it lengthwise.

A bale strand 50b whose terminal end 53 is retained by transfer mechanism E presently to be described soon after a new bale is started is drawn taut by the forward end of the bale and pressed into lower guide 150 as it follows bale slot 80 and also into the divergence 175, 176 of the holder 151, and when its tautness becomes acute it will be pressed firmly into its seating at the apex of the angle of member 170. Preferably the strand end in mechanism E, the seating in the apex of member 170 and the bottom of groove 161 are in vertical alignment. If the knotting mechanism be operated by hand such a free end will simple be pushed into the holder 151 and then carried downwardly and entered into groove 161 thence under it and around the bale, whence it will be drawn across the under side and its opposite ends brought to bear in the mating needle strand lower guide 180 located transversely opposite lower guide 150. Thence it would be drawn upwardly and over upper needle strand guide 185 and be intermediately pressed into a needle holder 190 which lies between lower guide 180 and upper guide 185. (For these needle strand guides and holders see especially Fig. 1 for the general view and Figs. 5 and 14 to 17).

Referring particularly to these figs. and first to Figs. 16 and 17 which show the mating lower guide 180, note that the form of this lower guide is essentially the same as that of the lower guide 150 applying to the bale strand save in the fact that it is oppositely mounted. Its similar features therefore are similarly numbered, its groove 161, its inclined groove face 162, its flanged groove wall 163 and flange per se 164. On the other hand its main body is considerably thicker, it is not centrally slotted, and instead of being secured to the member 152 it is secured to the member 700 which mounts it by an angular extension from its main body and it is secured by screws to the inner side of that member through the outer face 181 of its main body. Guide 180 is transversely aligned with guide 160 and inasmuch as it needs guide and position the oppositely extending needle main strand 50n its groove 161 is oppositely disposed.

The upper guide 185 (see Figs. 10 and 15) and the intermediate holder 190 are also supported by this member 700, which member is a part of the strand laying mechanism presently to be described. Member 700 oscillates between the position in which it is shown in Figs. 1, 2 and 10, the needle position which is shown in Fig. 5. Insofar however as it functions as a part of the knotting mechanism A it suffices for the present to say that that portion of it which carries guide 180 and 185 and the holder 190, is during the functioning of the knotting mechanism in transverse alignment with the vertical support 152 of the corresponding bale strand guide 150 and its holder 151.

The upper needle strand guide 185, while it is provided with a strand guiding groove 161 constituted in cross section substantially identically as are grooves 161 of the lower guides 150 and 180, has its main body foreshortened by omitting that portion which lies rearwardly of the transverse plane of symmetry 186 of the knot (see Figs. 1 and 15). It is thus constituted substantially a quadrant, the groove of which faces forwardly (away from the needle) and upwardly. Like the guide 150, it is secured to one side of its supporting member by an integral angular extension 167.

The intermediate needle strand holder 190 is comprised of a rigid member 191 secured to the forward side of the member 700, and a coacting bow spring 192 secured to the forward side of the vertical upright 152 much in the same manner as is the bow spring 173 of holding device 151 secured to the rearward side of the apparatus. However, both the rigid member 191 and the flexible bow spring 192 extend transversely instead of longitudinally. Moreover the free end 193 of the bow spring engages against the flat forward face of the rigid member 191 intermediate a pair of grooved ears 194, the groove 195 of which has a cross section generally similar to if not identical with the cross section of the grooves 161 of the several guides heretofore described. Moreover the groove 195 is substantially in vertical alignment, at least is arranged substantially in the same vertical longitudinal plane, as are grooves 161 of the needle strand guides 180 and 185. While the guides 180 and 185 and the holder 190 in this relative arrangement, if member 700 is moved rearwardly (toward the needle) and a free end 51 of a main strand 50n is entered and held within the grooves 161, when the member 700 is again moved forwardly into transverse alignment with the upright 152, the free end 51 already entered in groove 195 will be engaged by the extremity 193 of the fixedly mounted bow spring 192 and held yieldingly, that is to say in the manner to resist its being dragged or pulled longitudinally out of the holder. Free ends 51 respectively of main strand 50b and 50n are illustrated in Fig. 29 as so guided and held by the several guides and holders, the detail of which has been set forth.

It is to be noted with particular reference to Fig. 10 that bale strand guide 150 and the associated holder 151 are spaced transversely from the juxtaposed needle strand guide and holder 180 and 190. This space is provided for the movement therethrough and between the strands 50b and 50n of the free end inserting means 400 presently to be described as a principal element of the inserter device at large. The guides 150 and 180 and in particular their relatively thin flanges 164 spread strands 50b and 50n apart and hold them spread apart to permit the functioning of the inserting member 400 therebetween. Thus the guides and holders in addition to their functioning as such also function as strand spreading means.

Once the lays are made following the placement of the tie around the bale, under appropriate tension it is necessary to retain that tension during the making of the knot for the ends of the knot must be freed for those manipulations required for the making of the knot. This is the function of the bale case clamping devices of the knotting mechanism A. Referring to Figs. 3 and 4 these devices are designated generally 225. There is provided one of them on each side of the wrapping device a sufficient distance removed from the wrapping device to avoid interference with its operation, thus a pair for each tie. In our tier we have combined the elements of the device in such a manner that it may function also as a pull-up device to take up slack and tighten the knot after the knot is completed.

The central elements of the devices comprise spaced abutments 226, 227 secured on one side of slot 80, and coacting movable abutments 228 projectible between the fixed abutments from the opposite side of slot 80. The respective fixed and movable abutments on opposite sides of the plane of symmetry 186 of the knot are respectively located on opposite sides of the slot. Fixed and movable abutments 227, 228 are in the form of rollers which are engaged with the main strands 50b and 50n, while the fixed abutments 226 are not provided with rollers but are instead provided with inclined rectilinear or curvilinear surfaces 229 against the rollers 228 constituting the movable abutments are adapted by reason of the limited space between them to clamp the strands as clearly appears in Fig. 4, thereby to retain the main body of the tie under tension about the body of the bale. As an aid to this retention the extremity 230 of abutments 226 makes an angle with the surface 229 over which the twine is drawn. The corner of the angle is of course appropriately smoothed or rounded to avoid cutting. The respective abutments are located as clearly appears in Fig. 3 at such respective elevations as to appropriately engage the inclined lengths of the twine.

The movable abutments 228 are carried at the end of arms 235 respectively fixedly mounted on vertically extended oscillable shafts 236 having lower and upper bearings 237, 238 respectively upon the base 75 and the upper transversely extending members 79 and 80 of the main frame of the tier (or extensions of them). Shafts 236 are oscillated by means of crank arms 240, 241 which are interconnected for simultaneous operation through and arm 242 fixed on shaft 236 to which the arms 235 is also fixed, and an intervening link 243. Power for the operation is derived from and timing of it is controlled by a cam 555 of the mechanism B through the intermediary of an operating cam link 245 whose forked end 246 embraces timing mechanism shaft 560 and whose follower 246 is engaged by the cam, the far end 247 of the link connecting directly with the short crank arm 241 which is fixedly curved by shaft 236.

So organized, the movable abutments 228 may be moved from dotted line position 250 in which the abutments lie completely apart, the fixed abutments lying on one side of the twine and the movable abutments on the other, to their full line positions shown in Fig. 4 in which strands laid between them while they were apart, are clamped between abutments 226 and 228 while the knot is being formed. The knot being completed, abutments 228 may be moved to second dotted line position 251 for the purpose of pulling main strands 50b and 50n around the fixed roller abutments 227 to take up the slack and so draw the wraps toward each other about the inserted ends and tighten the knot.

The wrapping devices of the knotting mechanism are also shown in Fig. 29 but they are shown in greater completeness in each of Figs. 1, 2 and 5, and in their greater detail in each of Figs. 9 and 10. Each device is comprised of a pair of oppositely rotating wrapping gears 300, 301 located, the one outwardly beyond the bale slot 80 and on one side (the forward side) of the transverse plane of symmetry 186 of the knot and the other, 301, located inwardly of the bale slot 80 and on the opposite side of the transverse plane of symmetry 186. Each of the wrapping gears is provided with a hollow journal 302 borne rotatably within bearing 303 formed in a transversely projecting arm 304 of a gear frame 305, which gear frame is so mounted as to be transversely reciprocable. Each of the journals 302 has removably secured to its opposite end (that is to say the end juxtaposed to the transverse plane of symmetry 186) and arm 310 which bears at its outer end a wrapping finger 311. These wrapping fingers 311 are rotatable by the gears 300, 301 in planes which intersect the vertical planes of the main strands 50b and 50n in which the free ends 51 are held by the several guides and holders of the strand guiding and holding device, but they are normally at rest and disengaged from these free ends. Indeed the arms 310 (as can be discerned from inspection of Figs. 1, 9 and 10) normally extend horizontally away from the strands and hold the fingers 311 away not only until the gears themselves are moved to engage the main strands, but also until they have thereafter commenced to rotate. To permit the gears to be moved to engage the main strands each of the gears and their associated journals and journal bearings are complementally (in their rest positions) radially slotted as at 320, as are likewise and in registry the shoulders 321 of arms 310, which shoulders retain the journals in their bearings (see Fig. 10). The journals 302 at the mouths of the slots 320 are provided with long outwardly flared lips 322 and both slots and lips are downwardly inclined to receive the downwardly inclined portions of main strands 50b and 50n which reach to opposite extremities of the bale. Thus as the gears are moved towards and upon the main strands the lips 322 enter the strands in the slots 320, and they pass up the incline of the slot to be reached by the axis of rotation of the gears as the gears come to rest upon the strands and are ready to begin their wrapping. Such positions of the gears are present in the illustrations of the series of operational diagrams of Figs. 29 to 32 inclusive.

The wrapping fingers 311 are of very special construction devised with a view to the elimination of articulated finger members, springs and the like which are subject to dust and straw interferences with their operation. These fingers consist of integral and rigid members rigidly attached to the arms 310 which bear them. One of them is shown in perspective detail in Fig. 33 and their functioning is well illustrated in Figs. 29 to 32. Each consists of a small block of metal 330 having on one side an integrally formed stud 331 by means of which it is attached to its wrapping arm 310 by passing the stud through a hole in the arm (not shown) and applying a nut 332. The block 330 is hollowed out longitudinally (337) to afford a bayonet lock slotting to receive the twine on its upper side 335 (the side presenting away from the axis of the wrapping gear). The under wall (that toward the axis of the gear) is provided with a V-shaped slot 336 which communicates with the hollow interior 337 of the block and extends from its open end (presenting in the direction of rotation of the gear) well toward the opposite end of the block. The one side wall 338 of slot 336 is relatively thin and parallel to the adjoining block face 339 (the side opposite stud 331 and lying nearest the upright 152 and the member 700), while the opposite side 341 extends diagonally of the block. The apex 340 of slot 336 is narrowed sufficiently to receive a diametrically somewhat compressed twine engaged in it and to afford a measure of drag upon and resistance to movement of twine through it. The top 335 of the block (the face presenting away from the axis of the wrapping gear) is also provided with a slot communicating with the hollow interior 337, but this slot 346 is not only open at both ends, but also extends from end to end of the block. At its entering end its walls too are V-shaped, but in this case comprised of a parallel wall 347 on the stud side of the block and an inclined diagonally extending wall 348 on the opposite side. Thus in plan the projected wall 348 crosses the projected wall 341 and the bayonet slotting is completed, the overhanging remaining portions 345 of the outer face 335 bayonet locking the twine in the finger once it has been entered in the slot. Such entry and locking is shown in sequence in Figs. 29 and 29a. Observe in reference to Fig. 29 that gears 300, 301 revolve the twine fingers 311 oppositely with the twine fingers 311 and slots 336 traveling on circles of revolution substantially intersecting the vertical lines occupied by the free ends 51 which the fingers are engaged to wrap. So operated the fingers 311 engage the free ends 51 within their slot 336, 346, entering the twine at the widest portions of the slots. Observe further by reference to Fig. 29a that as the rotations progress the free ends 51 are deflected by the inclined walls 341 and 348 and caused to pass within the hollow 337 of the finger and snap under the overhang 345, whereupon they are in bayonnet locked engagement with the finger. The resisting drag of the yieldingly engaging twine holders 151 and 190 provides such tautness of the free ends 51 as is requisite to achieve this bayonnet lock to the fingers. Thereafter as rotation progresses the narrowed twine compressing apex 340 of slot 336 combined with the substantially right-angled turn of the twine as positioned beneath the overhang 345 provides drag upon the free ends. By appropriate adjustment of the form and dimensions of slots 336 and 346 and of the hollow 337 of the block this drag insures desired tightness to the turns even after the free ends are entirely withdrawn from the holders 151, 190, that withdrawal preferably taking place before the first turn is completed. A rounding of the rear end 349 of the inclined wall 348 is illustrated. While not so shown it is to be understood that all edges are to be appropriately rounded to avoid cutting of the fibers of the twine and undue drag. Wherever needful of course in any such device this provision against undue wear and cutting is to be made. Undercutting of the overhang 345 as at 350 aids in retention of the end under the overhang.

The wrapping device of the knotting mechanisms so organized is geared to the timing mechanism B for its driving and its sequential operations. The wrapping gears 300, 301 are mitred gears whose mates 360′ are journaled on transverse axes in the same slidable gear frames 305 in which the wrapping gears themselves are journaled. The frames 305 are slidably borne, respectively those of gears 300, on transversely through-running drive shafts 361 carried in outboard bearing brackets 362 (see Figs. 1, 2 and 5) and those of the inwardly located wrapping gears 301 on a relatively shorter drive shaft 365 journaled in centrally located bearing brackets 366. In the case of gears 300 support from the drive shaft 361 is by means of an integral sleeve 367, but in the case of gears 301 support is afforded directly by the mitred gear 360 which is slidably key-connected to shaft 365, the key being shown in Figs. 1 and 5 but not in other figures. However, an overlying supporting slide shaft 386 located substantially at the same level as the drive shaft 361 but having substantially the same length as shaft 365 is fixedly borne by bearing brackets 366 and assists drive shaft 365 in the support of frames 305 by engaging in sleeves 367 in the same manner as does drive shaft 361. In this wise it becomes possible to use substantially identical supporting frames 305 for each set of wrapping gears. Drive shaft 365 and supporting shaft 368 of gears 301 of course stabilize gear frames 305 against driving torques. As further stabilization for these frames, and as the primary stabilizing means for the frames 305 of the outer gears 300 gibs 369 are provided on the bottoms of the bearing brackets 366 and engaged in slots in the downwardly extending portions 370 of gear frames 305.

Power for the wrapping gear drive is provided by a chain 371 driven from sprocket 550 of timing mechanism B. This chain is located in the longitudinal plane of symmetry 425 of the duplex tier at large. Its top reach passes over sprocket 372 affixed to drive shaft 361. Its bottom reach passes under sprocket 373 affixed to drive shaft 365. Intermediate the two drive sprockets 372 and 373 the chain is engaged on its under side by a vertically adjustable idler sprocket 374. Between drive sprocket 373 and sprocket 550 of timing mechanism B the lower reach of the chain is engaged by a second vertically adjustable sprocket 375. A gear 376 having an extended sleeve 379 journaled in sleeve 367 of frame 305 of the outer gear 300, has that sleeve slidably splined on drive shaft 361, and this gear 376 meshes with a mating gear 377 affixed to the journal of gear 360 wherethrough wrapping gears 300 receive their power. Sprocket 373 of course directly supplies power to shaft 365 and so drives wrapping gears 301 through splined on gears 360′.

The transverse shifting of the wrapping gears into and out of engagement with the main strand 50b and 50n of the lays is achieved by cam-operated levers 380 and 381 applying respectively to the outer and inner wrapping gears 300, 301. See particularly Figs. 1, 2, 5, 9, 10, and 12. The levers are of the bell crank type pivoted at 382, the levers 380 to transversely extending frame member 79 and the levers 381 to an extension 85 frame members 78. The long arms of levers 380 connect with the gear frames 305 by transversely extending links 382a, while the long arms of levers 381 engage directly with their gear frames 305 through rounded ends working in slots in frame extensions 383. The short arms of levers 380, 381, terminate beneath vertically reciprocated cam plates 384 and these short arms are borne upwardly into contact with the under side of the plates by coil springs 385 as appears in Fig. 9. A similar spring operates similarly upon the levers 380 as indicated in Figs. 1 and 5. Cam plate 384 is adjustably mounted upon an extension from the lower end of the slidably mounted shank 386 of the cam follower 387. The shank 386 which is associated with lever 381 is slidably supported in a slide bearing 388 borne from the same face of frame member 85 which carries the lever pivots 382 and the shank 386 which is associated with lever 380 is similarly supported in a block 388 borne from the frame member 79. Cam follower 387 is in the form of a cam roller supported between ears 389 formed in the upper end of shank 386. Operating cams 551 of shaft 552 of mechanism B, the timing mechanism drives followers 387 to achieve the transverse shifting of the gear frames 305. As thus arranged the gears are shifted into operative engagement with the twine lays under power and retracted therefrom by the springs 385. We have, however, successfully operated a reverse arrangement under which the springs 385 achieve the shifting into engagement and the cams 551 shift the gears out of engagement.

The inserter device 400 is shown in general in Figs. 1, 3 and 5 and in enlarged detail in Figs. 10, 11 and 12. Its central element is an inserting means comprising a pair of pointed inserter hooks 410 depended with their barbs 411 facing each other from the outer convex side of main bodies 412 which bulge outwardly beyond the sides of supports 152 and 700 to maximum convexity on opposite sides of the transverse plane of symmetry 186. The shanks 413 of the hooks 410 are inclined inwardly toward the plane of symmetry in continuation of the convexity of the bulged main bodies 412, while the inner sides 415 of the barbs 411 are outwardly inclined, the two meeting at the points 416 of the hooks. The side walls of the shanks and the barbs as can clearly be seen from the elevation of Fig. 11, as well as the outer walls of the bulging main bodies 412 and the grooves between the barbs and the shanks are inclined inwardly counter-clockwise if we view them from above. This, as will appear, is an accompaniment of the indicated relative directions of rotation of wrapping gears 300, 301 as they appear in Fig. 10. As viewed from the right, gear 300 turns clockwise and gear 301 counter-clockwise. These inserter hooks are shown as made in two pieces but they may be made in one piece. They are secured (by means not shown) to an outer arm 420 of an inserter plate 421 vertically reciprocable in the transverse plane of symmetry 186, the arm 420 passing through and reciprocating in slot 166 of guide and holder support 152. The walls of slot 166 laterally support and guide arm 420 of plate 421 and inserting means 400 is in turn supported in position to reciprocate in the space between the mating guides 150, 180 and holders 151, 190. So reciprocated it may be halted at different elevations, in one of which its bulges 412 serve to spread and guide the wraps of the knot, and the points of its hooks according to their elevation either switch the wraps outside of the hook shanks to complete the turns or inside of the hooks to be caught up in the grooves of the barbs and pulled upwardly to insert the terminal ends between the main strands and so complete the knot.

Inserter plate 421 and its arms 420 are symmetrical with respect to the longitudinal plane of symmetry 425 of the tier at large. The form of the plate 421 and its arrangement can be seen in Fig. 12. Its lower end is provided with an open end slot 427 between the arms 420 to prevent fouling of the idler sprocket 374 (Fig. 1) on the down stroke of the plate. Its upper end is provided with an aligned closed end slot 428 by means of which shaft 552 of timing mechanism B is passed through the plate and is made to serve as a vertical guide for the plate. Other vertical guiding means (not shown) may be appropriately applied to other portions of the plate 421. Vertical reciprocation of plate 421 is afforded by inserter cam 556 on auxiliary turner shaft 552 of the timing mechanism B. This cam is so geared to the timing mechanism B as to time the movements of the inserting means 400 to its several operative positions. It acts upon cam follower 430 connected with plate 421 to raise the plate to an uppermost position (that shown in Fig. 12) while a pair of reactive springs 431 anchored to the longitudinal frame members 77 act on the upper end of the plate 421 through a cross beam 432 secured to the plate to effect the several successive downward movements of the plate under the guidance and restriction of cam 556. A stop 435 is adapted to impinge on a collar 436 (Fig. 1 and Fig. 12) and together with the cam define the lowermost extremity of movement of plate 421. Collar 436 confines plate 421 to the transverse plane of symmetry 186 by bearing on one side of it while the hub 557 of cam 556 similarly confines it on the other side.

Figure 6:
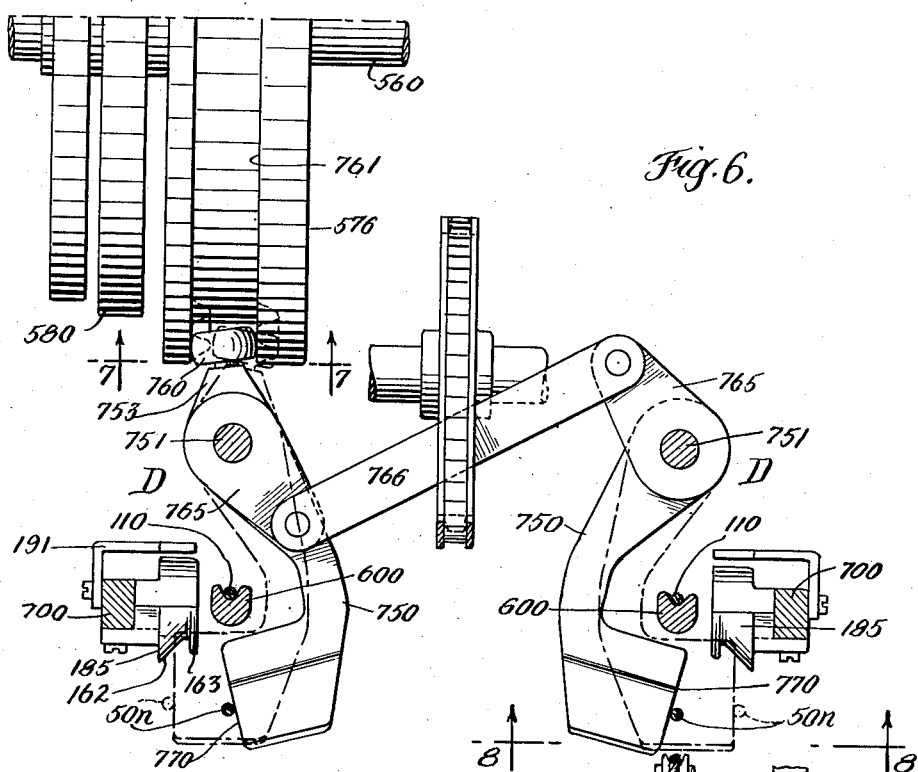
Figure 6 is an enlarged cross section of the twine finger mechanism taken on the line 6—6 of Figure 5.
Figure 7:
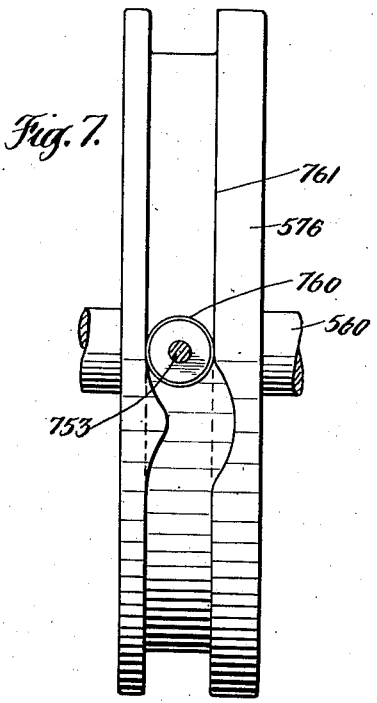
Figure 7 is a face view of the twine finger cam of Figure 6 viewed from the line 7—7 of that figure.

This mechanism appears principally in Figs. 1 to 5, though certain of its timing cams appear in Figs. 6 and 7. Its central elements are the timing shaft 560 and the one revolution and stop clutch 561 which drives it through a single revolution and stops. The shaft is carried in journal bearings 562 located at the joinders between the uprights 76 of the frame at the needle end and the longitudinals 77. The clutch 561 is of the commonly known type employed in balers and need not be described in detail. Suffice it to say that it receives its power by chain and sprocket drive 563 from the same source which drives the baler at large, and is controlled from any form of bale metering device through a linkage connection 564 associated with its trip crank 565 which appears in Fig. 2. The longitudinally extending auxiliary timing shaft 552 already referred to in connection with the description of the wrapping gear shift of the knotting mechanism A, is driven from the main timing shaft 560 through the intermediary of mutilated mitre gears 567. It is journaled in bearings 568 and 569 respectively carried by the transverse frame members 78 and 79. The timing cams 551 already referred to as timing and controlling the gear shift movement appear in each of Figs. 1, 2, 5, 11 and 12. The auxiliary timing shaft 552 also carries the timing and movement control cam 556 referred to with reference to Figs. 10 and 12 as timing and controlling operation of the inserter device embodying inserters 400. The main shaft, however, carries the remainder of the timing cams. There are three of these, each controlling the timing and movements of a different one of the devices entering into the timer at large. First there is the cam 555 referred to as timing and controlling the bale case clamp and pull-up device 225 described with the aid of Figs. 3 and 4, the control being exercised through cam lever 245. Second, there is a cam 575 which times and controls the movement of the lay arm 700 of the strand laying mechanism D described with reference to Fig. 10 in particular as carrying movable guides 180 and 185 and holder 190. Third, it bears the cam 576 which times and controls the movements of the needle loop transfer device of the strand laying mechanism D. Finally, through mutilated spur gears 580, shaft 560 drives a second auxiliary shaft 581 through the intermediary of an idler 582 and so drives sprocket 550 heretofore described in connection with the knotting mechanism as supplying power and timing for the wrapping gears through chain 371.

The needle strand 50n of the tie 102 (see Fig. 5) is presented for its entrance into the tie by the needle mechanism C. This comprises a needle 600 for each tie to be made. The needles are borne by the usual U-shaped needle yoke 601 which straddles the bale case 100 from beneath and is supported from and oscillated about its bale case borne bearing studs 602 by means of a link connection 603 with the needle driving crank or cranks 604 driven by the main timing shaft 560. Inasmuch as this type of needle mechanism is so well known and its employment involves no novelty, but a diagrammatic showing of link 603 and crank disc or crank 604 and arm 605 connecting the link to yoke 601 are indulged in. As is well known, when the crank or cam 604 is at its upper extreme of movement, the needles 600 are all the way in, and when at their lower extreme of movement the needles are all the way out. When cranks are used these positions are 180° apart, measured in angularity of timer shaft movement, but when cams are used these angularities and needle timing these movements can be appropriately varied as desired.

The roller equipped points 610 of the needles move in the plane of the bale ties 102, and as the needles are moved upwardly they engage strand 110 leading from the baler coil which supplies the ties and carry it upwardly around the end of a completed bale to form the so called needle loop and to enter it into the tier for the formation of the knot. The needle strand 50n comprises the front of this loop and is drawn taut between the point of the needle 610 and the rear corner of the completed bale to be tied. This taut rectilinear strand 50n is to be engaged by the strand laying mechanism whose principal element is the lay arm 700 already described and the guides 180, 185 it carries.

The lay arm 700 of the strand laying mechanism is oscillated from its lay position in the knotting mechanism A, in which the upper and lower strand guides 180, 185 are juxtaposed to fixed guide 150 and free end transfer mechanism E as shown in Fig. 10 to the needle strand receiving position shown in full lines in Fig. 5. The lower portion of the arm, normally vertical and parallel to fixed guide support 152 now occupies an inclined position to the rear of needle strand 50n of the loop and substantially parallel thereto, and the lower and upper guides 180, 185 are in positions to receive the needle strand. Its movement and its positions respectively in the knotting mechanism A and the needle mechanism B are achieved by mounting arm 700 above these positions upon a transversely extending oscillatory shaft 710 carried in suitable bearings provided in bearing brackets 711 erected upon the upper sides of the longitudinal frame members 77, and driving the arm and the shaft 710 (which shaft bears commonly each of the several arms used in the tier at large) by means of the cam link 712 stabilized about shaft 560 by slotted connection 713 and provided with a cam follower 714 activated by the cam 575 of shaft 560. Insurance of the correct relative angular positions of the guide carrying lower end of the arm 700 in the knotting and needle mechanisms is had through the expedient of locating the shaft 710 intermediate the two positions and giving the arm a bent form, its lower end being bent toward the needle mechanism. This combination of longitudinal and vertical positioning of shaft 710 and angular bending of arm 700 achieves as well the desired positioning of guides 180, 185 longitudinally of the needle strand 50n of the loop.

The needle strand 50n is transferred to the parallelly positioned guides 180, 185 by the needle strand transfer device, the central elements of which are a pair of oscillable strand transfer fingers 750, one above and one below the guides. They are mounted for oscillation upon an oscillable shaft 751 borne from the main frame in pintle bearings 752 (see Figs. 1, 5, 6, 7, and 8). The upper pintle bearings are borne from transverse frame member 78, while the lower are borne from the adjacent upright frame members 76. Shaft 751 is oscillated by cam lever 753 whose follower 760 engages in the groove 761 of drum cam 576, the third of the cams carried by timer shaft 560. Both pairs of transfer fingers 750 are commonly controlled from this cam through the employment of lever crank and link connections 765, 766.

Figure 8:
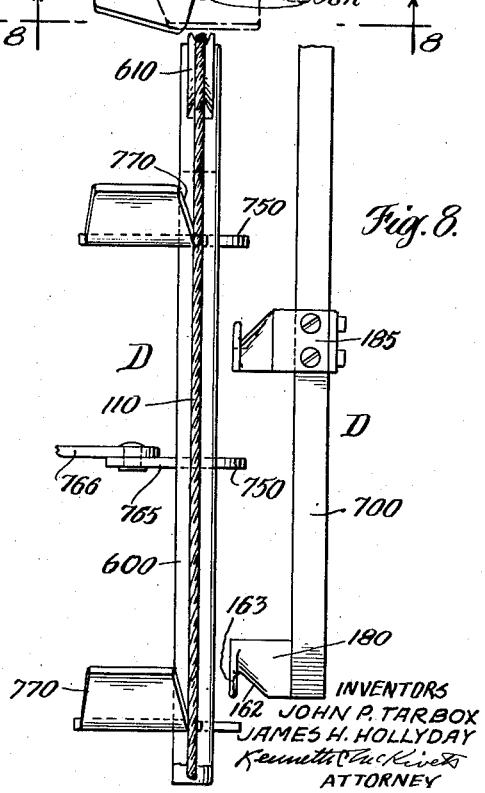
Figure 8 is a face view of one of the pairs of twine fingers and its associated lay arm from the line 8—8 of Figure 6.

As can clearly be seen by reference to Figs. 5, 6 and 8, the ends 770 of the fingers 750 are turned outwardly (with respect to the longitudinal plane of symmetry 425 of the tier) and these ends are located on the opposite side of needle 600 from the finger axis 751, that is to say on the side of needle strand 50n, whereby as the fingers are oscillated they may be moved first to the full line position at the plane of the needle loop, and then further, to the dotted line position where their ends enter the plane of oscillation of the guides 180, 185 and cross it. The ends 770 of fingers 750 are dubbed off and given longitudinal extent both to the front and rear of needle strand 50n, whereby certainly to engage these strands when the fingers 750 are oscillated and to continue that engagement with certainty. The finger ends 770 engage the strand 50n simultaneously, then move it parallelly to the plane of movement of the lay guides 185 as shown in dotted lines in Fig. 6, and then into that plane, then the guides 180, 185 when ascillated forwardly toward the knotting mechanism can engage the newly positioned strands 50n on their extended inclined guide groove walls 162 and so carry it away from the ends 770 of twine fingers 750 and from the needle 600 and into its proper lay in the knotting mechanism A. The lay arm is accurately stopped in its lay position by an adjustable abutment 780 (Figs. 1 and 2). In the early course of such movement, strand 50n slides down the generous and extended inclined walls 162 of the guide grooves to the bottoms of the grooves, where it lies against and is positioned by the relatively thin guide flanges 163 as clearly appears in Fig. 10. At this stage, the needle having meantime withdrawn, the needle loop has a triangular form which appears in Fig. 24 and is ready to be cut, as shown in Fig. 25, to enable the needle strand 50n to enter the knot.

For an understanding of this mechanism refer once again to Figs. 10, 11 and 12 with reference to which the inserter device was described. The mechanism is designated generally E. Its central elements are a cutting blade 800 and a twine clamp 801. Both cutting blade and clamp are carried from and operated by the long arm of an L-shaped transversely slidable member 802 mounted and guided for transverse sliding in the slot 803 of a block 804 secured by means (not shown) to the rearward face of the transverse brace 153 to which the upper ends of guide supports 152 are secured. Slot 803 is closed at the bottom but open at the top and slide 802 is confined within and aligned by a cap member 810 which closes the open top of the slot 803. Slide 802 is transversely reciprocated in the slot by sweep cams 815 bolted to the rear face of inserter cam plate 421 which engage cam followers 816 carried at the upper extremities of the short arms of the L-shaped slide 802. They are moved outwardly by these cams against the pressure of return springs 817 confined between abutments 818 extending transversely from the short branch of the L and 819 extending vertically upward from the cap plate 810. The cutting blades 800 are secured to the forward side face 820 of the slide 802 at its outer end, the side face being recessed to receive them to a depth bringing the cutting face 821 substantially into alignment with the main body of slide 802 so that it may be retracted with the main body into the slide bearing block 804 (see Fig. 13). The arrangement is such that this cutting face 821 of the cutting blade 800 is in alignment with the rear face 187 of the upper guide 185 of the strand laying mechanism (see Fig. 15 for detail) and this face 187 of upper guide 185 is hardened and constituted a mating-cutting edge or face for the cutter 800. It will be apparent that they both lie in the transverse plane of symmetry of the knot to be tied. Thus a needle loop carried by the guides 180, 185, and bottomed in the groove 161 of guide 185, upon reciprocation of cutter 800 outwardly is cut in the transverse plane of symmetry 186 of the knot and equalized free end lengths are had.

The clamp 801 is a jaw clamp, the lower jaw 830 of which is an integral part of, at least rigid with, the main body 802 of the slide, while its upper jaw 831 is movable up and down to open and close the clamp. It is movable about a transversely extending pivot 832 in the main body 802 and is provided with a rearward extension 833 which underlies the angle of body 802 and is open to access from the under side of this member. To permit these movements and access, the main body of the slide is hollowed out from end to end but reversely at opposite ends, its outer end being hollowed out from the top, whereas its inner end is hollowed out from the bottom, and the movable member 831 is dimensioned to be accommodated within the slot. Indeed its outer end is relatively so narrow as to be accommodated within the centrally slotted or bifurcated end of the fixed clamping member 830. Its under side is provided with teeth or serrations 835 the better to hold a strand engaged between the jaws. A relatively light bow spring 836 normally biases the movable jaw 831 into engagement with the fixed jaw 830 and the points of the jaws are diverged from each other the better to be parted by a strand when projected into contact therewith, whereby readily to receive the body of the strand and clamp it. Pivoted between ears 840, projected downwardly from cap plate 810, are a pair of pawls 841 which rest on the bifurcations of the lower jaw 830 and point downwardly and inwardly of the clamp. They are yieldingly lightly thrust downwardly by the bow spring 842. Their function is to free the clamp 801 of the old terminal end as the clamp is moved outwardly, but to yield when the clamp acquires a new free end and again moves inwardly, and permit the new terminus to be thus transferred from the plane of guide 180, 185 to the plane of fixed guide 150 and holder 151 of the guiding and holding mechanism. Once so transferred, a severed strand end engaged between members 830 and 831 of clamp 801, when cam plate 421 reaches its upper extreme of movement, instead of being lightly clamped incident to the pressure of the light spring 836, becomes heavily clamped by reason of the engagement of the inner end 833 of movable jaw 831 by the head of an adjustable set screw 850 carried by an offset 851 from the rear face of plate 421, and is held fast against bale forming tensions. To recapitulate, as cam plate 421 moves downwardly at the inception of the knotting operations, jaws 830, 831 of the clamp 801 are first freed of the old end 53 by pawls 841, then engage with and lightly clamp upon the top of the needle loop just to the rear of cutting face 187 of upper guide 185. Immediately thereafter the needle loop is severed by cutter 800 in co-action with the cutting face 187. Upon ensuing upward movement of inserted plate 421 the severed end within the clamp 801 is transferred inwardly from the plane of guides 180, 185 freely passing pawls 841 to the plane of fixed guide 150 and holder 151, and there firmly clamped against the tensions soon to be imposed upon it by the formation of the next bale.

The coordination of the several component mechanisms of the tier, the knotting mechanism, the timing mechanism, the needle mechanism, the strand laying mechanism, and the free end cutting and transfer mechanism, and their component devices and elements, is effected by an adjustment of the timing of their movements through appropriate proportioning and relative angular arrangements of the several timing cams and mutilated gears which have been pointed out. Inasmuch as these factors can be varied and should be varied by those skilled in the art to suit varied dimensions of barrel knots of different numbers of turns and different free end lengths, and to suit desired baling speeds and desired baling rates, and the most desirable acceleration and deceleration rates and velocities of the elements involved, no attempt will be made to specify herein particular cam dimensions and forms save as it may be necessary to clarify functional operations as the operation at large is followed through. Instead the operation will be followed through principally by reference to Fig. 20 which affords a typical one of the many timing diagrams which can be worked out for the tier of our invention, the diagrams of Figs. 21 to 28 of the bale and tie in their various stages, and the illustration of the sequence of operations afforded by the co-ordinated diagrams of Figs. 21 to 29, 29a to 32. We will be guided outstandingly by Fig. 20.

Assuming that a bale has just been completed and the movement of the bale has disposed the tie 102 as drawn by reach 110 from the source of supply about the forward end 115 of the bale (Figs. 5 and 21) the following conditions obtain at the free end strand 50b. Its terminal 53 is firmly clamped between the jaws 830, 831 of the terminal end clamp 800 (see Fig. 12) by reason of the pressure exerted by stud 850 upon the tail 833 of the member 831. This is the condition obtaining when the tier is completely at rest, the parts occupying the relative positions shown in Figs. 11 and 12 as well as in Figs. 1, 2 and 9. That is to say, the inserter device is in its extreme upper position, the wrapping gears 300, 301 and wrapping fingers 311 are at rest on opposite sides of and free of the vertical plane of the knots and the layarm 700 is at rest in parallel juxtaposition to the fixed support 152. The timing mechanism is idle and all of its timing cams and mutilated gears are in what we may call the zero degree position illustrated at the top of Fig. 20. This condition has obtained ever since the preceding bale was completed and its knots were tied and stripped. During this idle condition of the mechanism the front end 115 of the bale, as each wad was added to it, drew its free end 51b and main strand 50b farther and farther forwardly through the bale slot 80, soon pressing the free end 51b into guide 150 and yielding holder 151, and as the tautness increased firmly seating free end 51b in the yielding holder 151, so giving it vertical alignment in position to be engaged by the wrapping finger 311 of its gear 301, and thereby completing the lay of this free end of the bale strand. At this time the bale case clamp and pull up 225 associated with bale strand 50b is completely open as is also the corresponding clamp and pull-up for the needle strand 50n on the opposite side.

Now the completed bale through a metering wheel moves link 564 to institute the one revolution and stop movement of the clutch 561 of timing mechanism B, and main timer shaft 560 of that mechanism starts upon its single revolution, carrying with it its several timing cams and mutilated gears and through those gears at the proper times operating auxiliary timing shaft 552 and its cams. The successive angular divisions of the outer 360° circle of Fig. 20 designated by the legends—main shaft, needle lay arm, twine fingers bale case clamps, inserter drive shafts, inserter, gear shift, wrapping drive shaft and wrapping gear, respectively designate by the extent of the arcs which are covered by the segments demarked by the angular division—the starting and stopping, the dwelling, and the direction and the extent of movements, of the principal parts to which the legends apply. To assist in identifying these principal parts, the numbers of these parts used in the detail drawings are used in parentheses in conjunction with the legends.

For the first nine degrees of rotation of timer shaft 560 only the needle mechanism is involved, the needle starting from its rest position all the way out of the bale case (not shown) entering the bale case and starting toward its all-the-way-in position. To reach this will require 180° movement of the main timer shaft 560 if a crank is used and any number of degrees desired short of that if a cam is used. The diagram of Fig. 20 applies to the crank-operated needle.

At 9° cam 575, through link 712, starts the lay arm 700 of the strand laying mechanism rearwardly to meet the needle and needle loop. Needle and needle loop and lay arm 700 approach full transverse juxtaposition at about 144°, the fact that the guides 180 and 190 of the lay arm 700 are approximately in strand receiving position being indicated by the legend "In" applied to the lay arm arc at the 144° position. At this juncture cam 576 starts the strand transfer fingers 750 toward engagement with the needle strand 50n (note Figs. 6 to 8). Within the 5° between the 159° point and the 164° point the lay arm 700 and fingers 750 have co-acted, the fingers by moving into strand contact as shown in full lines and then all the way into the dotted line position of Fig. 6, and the lay arm by starting back, toward its "Out" position as marked at the 179° position, so engaging the needle strand 50n in the grooves of the guides 180, 185, and the lay arm is on its way to effect the lay of the needle strand 50n in complement to the lay of the bale strand 50b as effected by the bale itself. These intermediate stages are diagrammed in Fig. 22 and Fig. 23. Degree designations relating the diagrams of Figs. 21 to 28 to that of Fig. 20 have been applied to these diagrams. Fifteen degrees later cams 576 and 575 have respectively completed the retraction movement of the fingers 750 to their normal positions of rest, and the lay arm 700 has completed the lay of the needle strand 50n and its free end 51n. This is at the 179° point and noted by the legends "Out," and the situation is diagrammed in Fig. 24. In completing this lay the arm 700 has brought together about the free end 51n the two parts 191, 192 of the yielding holder 190 of the needle strand. In fact the body of the strand was received within the grooves or notches of the fixed member 191 by the same movement of the needle strand transfer fingers 750 which resulted in the placement of the strand within the grooves of the guides 180 and 185. Arm 700 comes to rest against adjustable abutment 780 which insures exact juxtapositions of its several elements with their co-acting elements.

At 174°, 5° ahead of the completion of the lay, cam 555 starts the bale case clamps 225 into action to embrace the main strans 50b and 50n between the fixed and movable clamp elements 226, 228 and so fix the tie about the bale under its existing tensions while the knot is being made. They become fixedly so clamped at 194° and continue to so hold the tie in place throughout the knot tying operations.

At 180° of timer movement mutilated gear 567 starts rotation of the auxiliary timer shaft 552 and through cams 551 starts the shift of wrapping gears 300, 301 in toward the strands. Allowing for the diameters of respective cam follower, these movement should be well under way at 185° or 187½°. The bale case clamps are "In" and have a firm hold on the strands at the 194° point.

As soon as cam follower 430 drops from cam 556 the inserter drops down precipitately. At 194° the inserter 400 comes to rest in its wrapping position in which its maximum convexity 412 lies in the horizontal plane of the knot to be formed. This means that the cam follower 430 (Fig. 12) has dropped from the top of the large lobe 450 of the cam to the intermediate lobe 451. There it is to rest during the wrapping of the turns, the intermediate lobe being formed on the arc of the circle about the axis of the shaft 552.

During this drop of the inserter 400, the sweep 815 through its follower 816 moves the L-shaped slide 802 outwardly and at the same time releases the inner end 833 of clamp jaw 831 from impingement with stop 850 thereby freeing the terminal end 53 of free end 51b which is to enter the tie. The further movement of this slide first cause the terminal end 53 to be engaged and held against lateral movement by pawls 841 (all this in reference to Fig. 12), with the reult that as the clamp jaws 830, 831 continue their outward movement lightly pressed together by spring 836, the terminus 53 is pulled out of the jaws and rendered free to enter the formation of the knot.

The further outward movement of the slide 802 engages the jaws 830, 831 through their divergent outer ends with the bight of the needle loop immediately back of the face 187 of the upper guide 185 (note Fig. 15) and the teeth of member 831 take hold of that strand. Immediately following and almost simultaneously, the edge of cutter 800 engages the strand in the transverse plane of symmetry 186 and cuts the loop so creating free end 51n for the knot, and so creating also new terminal end 53 and a new free end 51b. New terminal end 53 remaining held in the clamp 801 new free end 51b is prevented from dropping back as the needle commences its backward movement. This is the condition at the 202½° point as diagrammed in Fig. 25.

At the 202½° position the wrapping gears 300, 301 are all the way in as indicated by the legend "In" in Fig. 20, having entered upon the strands by way of their slots 320 and come to rest with their axes substantially upon the strands. Thereupon mutilated gear 580 starts in motion auxiliary shaft 581 for a complete revolution to starting the wrapping gears 300, 301 and the wrapping fingers 311 upon their revolutions (two revolutions in this case since sprocket 550 bears a two-to-one ratio to sprockets 372, 373). This condition we find depicted in the diagram of Fig. 26 and in the semidiagrammatic showings of Figs. 29 and 29a. The rotation of the wrapping gears continuing, a turn being made is completed by passing through the stages depicted by Figs. 30, 30a and 30b. When the auxiliary time shaft 552 has completed 125°, the main timer shaft has reached the 242½° point then the wrapping gears start their final revolution, and the inserting device cam 556 drops its follower to its lowest lobe 452 (Fig. 12), thereby placing the inserter hooks in their lowermost positions as depicted in Figs. 31, 31a, wherein their points 416 are located outside of the conical generatrix of the reach between the wrap just completed and the wrapping finger. As the last wrap is being completed the free ends 51b and 51n are first engaged with the inserter hooks 410 (Fig. 31) and immediately afterward are entered into them as shown in Fig. 31a. This is the situation at the 282½° point. These actions we have fully described at the opening of our specification.

At this point the inserter device starts its upward movement, under the urge of the convex side of the large lobe 450 of cam 556. A little time before the close of the upward movement of the inserter device the wrapping gears 300, 301 are quickly withdrawn from the strand. The inserter device reaches its upper extremity at 357½°, just before timer shaft 560 comes to rest, but the withdrawal of the wrapping gears is not completed until shaft 560 nears is zero position. In the meantime, however, the downward incline of slots 320 of the gears 300, 301 has instituted the stripping movement of the knot and the inserter proper 400 has drawn the free ends through the knot, drawn them upwardly between those portions 54 of the main strands which rest in the guides 150, 180. These stripping and inserting movements take place simultaneously. The condition of the knot at this stage is depicted in the diagram of Fig. 27 and the semidiagrammatic showing of Fig. 32. The final stripping and inserting actions result in complete withdrawal of the terminal ends 53 from the inserter hooks 410 and project the completed knot toward the bale.

Also in this meantime, approximately after the 323° mark, the cam 555 of the bale case clamp and pull up devices 225 through its second rise 570 (see dotted line showing in Fig. 3) projects the movable abutments 228 beyond the fixed abutments 226 so at about 335½° laterally pulling on strands 50b and 50n to take up the slack occasioned by the reaches 54 which flank the guides, so drawing the wraps together and about the terminal ends 53, and so tightening the knot substantially to the form shown in Fig. 34. This pull up movement occasioned by hump 570 of cam 555 may take place at any time after the inserter hooks 410 first emerge upon the upper side of the knot at which time the inserted terminal ends 63 are yet in the form of bows or loops. The pull up movement therefore may progress simultaneously with the completion of the insertion and the institution of the stripping.

With the knot so completed and the tier again at rest the bale just tied is ready to be progressed forwardly by the new bale being formed. This is the situation outlined in Fig. 28 in which the new strand 50b has been engaged by the newly compressed wad 850 comprising the head of the next bale and the new reach 50b is being pushed forward and toward the guide 150 and holder 151. The next wad or two of the new bale will soon repeat for the new bale, the lay illustrated in Fig. 21.

An automatic mechanism of this character is susceptible of many modifications without departing from its generic spirit, for each of its several component devices is in and of itself susceptible to modification. While their inter-relations are also subject to modification without departing from the generic spirit of those relationships, they are, perhaps, not so generally subject to modification. Modifications in each of these spheres are already known to applicants and it is intended that they be made the subject of additional patent applications rather than be constituted enlargements of an already lengthy specification. These and all other modifications not departing from the generic spirit of applicants' invention are intended to be comprehended within the spirit of the annexed claims.

What is claimed is:

1. A tier for tying together the free ends of a strand loop comprising, in combination, means for supporting side by side through their oppositely extended free ends the main bodies of the strands to be joined together, a free end inserter member reciprocable between said main bodies intermediate their free ends and transversely of the knot to be tied, a pair of wrapping fingers, one on each side of said inserter member, rotatable around the axis of the knot on paths respectively intersected by the supported free ends and adapted through their rotation first to grasp and then to wrap the free ends about the main bodies of the strands, and free end engaging means carried by said reciprocable inserter member engageable with the rotated free ends on one side of said knot and by virtue of reciprocation of the member carrying the engaged ends through the knot to the opposite side thereof.

2. A tier according to claim 1 in which the extended free ends of the strands are supported substantially at right angles to the axis of the knot and substantially in the planes of rotation of the wrapping fingers.

3. A tier according to claim 1 in which the inserter member is provided with a bulbous portion of a width greater than the distance separating the planes of rotation of the wrapping fingers, which portion is engaged by the free ends and locates the regions of wrapping, and said free ends engaging means are spaced to engage the free ends between the wrapping fingers and the regions of wrapping.

4. A tier according to claim 1 in which said reciprocable inserter member is provided on each side with a bulbous portion projecting beyond the plane of rotation on the adjacent wrapping finger to locate the region of wrapping, and the free end engaging means also projects on each side of the inserter member beyond the adjacent plane of rotation of the wrapping finger but to a less distance than the bulbous portion, whereby the free ends travel and are extended during rotation as generatrices of cones of revolution and are engaged for insertion while so extended.

5. A tier according to claim 1 in which the free end engaging means are in the form of hooks which are engaged with the free ends during their rotation.

6. A tier according to claim 1 in which the free end engaging means are in the form of hooks having points directed away from the axis of the knot, but positionable through reciprocation of said member to direct the rotating free ends into said hooks.

7. A tier according to claim 1 in which there is provided means relatively displacing the planes of rotation of the wrapping fingers and the regions of the wraps achieved thereby to cause the rotated free ends to travel as generatrices of cones of revolution, and in which the free end engaging means are in the form of pointed hooks whose points are directed away from the axis of the knot but are locatable through reciprocation of said member in one position to enable said free ends to by-pass the hooks on their shank sides, and in another position to enable them to enter said hooks to be drawn through the knot.

8. A tier according to claim 1 in which the axis of rotation of the wrapping fingers is shiftable from an idle position removed from the axis of the knot to a wrapping position substantially upon the axis of the knot.

9. A tier according to claim 1 in which the wrapping fingers are carried upon and rotated by gears having radially extending open slots to receive the main bodies of the strands to be tied and there is provided means to shift the gears from positions removed from the strands to positions in which the strands are received within the gear slots and the gears may be rotated thereabout.

10. In combination with a tier according to claim 1, means extending the main strands along lines lower than the axis of the knot, gears carrying and rotating the wrapping fingers having radially extending open ended slots to receive the main bodies of the strands, and means to shift the gears from positions removed from the strands to positions in which the strands are received within the slots, the said slots during the shifting being downwardly inclined to engage their open ends with the lower main strands.

11. In combination with a tier according to claim 1, means extending the main strands along lines lower than the axis of the knot, gears carrying and rotating the wrapping fingers having radially extending open ended slots to receive the main bodies of the strands, bearings for the gears also having open ended strand receiving slots, and means to shift the bearings and gears to positions in which the strands are received within the slots, all said slots being downwardly inclined and in axial registry during the shifting, and said bearing slots having their open ends provided with flaring lips projecting beyond the peripheries of the gears to first engage and direct the strands into the bearing and gear slots.

12. A tier according to claim 1 in which the means supporting said free ends is yieldable whereby when the wrapping fingers are rotated, they grasp the free ends and withdraw them from their supporting means as the wrapping progresses.

13. A tier according to claim 1 in which the wrapping fingers include means for retentively but releasably grasping the free ends, and the free end engaging means carried by the inserter withdraws them from the grasp of the fingers.

14. A tier according to claim 1 in which the wrapping fingers embody bayonet strand grasping slots having V-shaped entry ends and reentrant and offset lock overhangs to releasably retain the engaged free ends for the wrapping and inserting operations.

15. A tier according to claim 1 including means to lay up one free end in supported position as a part of a loop, and means to sever the free end part from the remainder of the loop located in a plane intermediate the free ends.

16. A tier according to claim 1 including means to lay up one free end in supported position as a part of a loop, and cutter means operated in conjunction with the inserter member to sever the free end part from the remainder of the loop.

17. A tier according to claim 1 in which the extended free ends of the strands are supported at substantially equal angles to the axis of the knot, terminal clamping and strand guiding means for one free end enabling it to be placed in supported position by movement of a package to be tied against it below the axis of the knot to be tied, means to lay up the other free end in supported position as a part of a loop of a height substantially equal to the height of the terminal clamping means, and cutter means located in juxtaposition to the top of the loop and substantially midway between the free ends, to sever the free end from the remainder of the loop, whereby the free ends at the time of severing are substantially of the same length.

18. A tier according to claim 1 in which the free ends are supported in planes on opposite sides of the knot axis and a terminal clamp is provided for the one free end together with associated strand guiding means enabling the said free end to be laid up in supported position by the movement of a package to be tied against the strand below the axis of the knot, together with means to lay up the other free end as a part of a loop, means for severing the loop to separate the free end from the remainder of the loop, and means for shifting the terminal clamp transversely of the axis of the knot from the one free end plane to the other, whereby to engage with the terminal of the loop remainder.

19. A tier according to claim 1 in which the free ends are supported in planes on opposite sides of the knot axis and a terminal clamp is provided for the one free end together with associated strand guiding means enabling the said free end to be laid up in supported position by the movement of a package to be tied against the strand below the axis of the knot, means lay up the other free end as a part of a loop, means for severing the loop to separate the free end from the remainder of the loop, means for shifting the terminal clamp transversely of the axis of the knot from the one free end plane to the other, whereby to engage with the terminal of the loop remainder, together with means operative at the one free end position to release the clamp from the package laid free end, means operative at the other free end position to engage the clamp with the terminal of the loop remainder, and means operative at the one free end position of the clamp to augment the clamping action upon the loop remainder terminal.

20. A tier comprising, in combination, means for supporting during the tie in adjoining planes through their oppositely extended free ends the main bodies of the strands to be joined together, free end inserter means movable between the main bodies longitudinally intermediate the free ends, rotatable free end wrapping members having idle positions spaced from said planes, means for shifting said wrapping members to operative positions in said planes and for rotating the members about the main bodies of the strands, and strand laying means carrying the supporting means for one of said strands.

21. A tier according to claim 20 including means to present a needle loop to enter a tie and in which said strand laying and supporting means comprises a shiftable arm having upper and lower strand engaging guides adapted to engage and carry the presented needle loop to lay position, together with a free end holding means intermediate said guides.

22. A tier according to claim 20 including needle means to present a needle loop to enter a tie in which said strand laying means comprises an arm shiftable from needle position to the strand supporting position and is provided with upper and lower loop engaging guides adapted to engage and lay the presented loop for the tie, together with strand cutting means associated with the upper guide.

23. A tier according to claim 20 in which said strand supporting means engage and support the free ends in substantially parallel lines substantially at right angles to the axes of the knot but on opposite sides of the transverse plane of symmetry of the knot, and the said wrapping means when notched intersects said lines of support.

24. A tier according to claim 20 in which needle means presents a needle loop at an acute angle to the axis of the knot to be tied, and the strand laying and supporting means embodies an arm oscillable from a loop engaging position at the angle of said loop to a strand supporting position substantially in the transverse plane of symmetry of the knot.

25. A tier according to claim 20 in which needle means presents in a given longitudinal plane a needle loop to enter the tie, and the strand laying and supporting means is reciprocable between the needle position and a strand supporting position in an adjacent plane, together with means for transversely shifting the needle loop and the laying means from the needle plane to the strand supporting plane.

26. A tier according to claim 20 including means to present a needle loop to enter the tie, said strand laying and supporting means comprising an arm shiftable from needle position to supporting position having upper and lower loop engaging guides together with a pair of twine fingers moveable in spaced planes embracing the guides when they are at needle position to effect transfer of the loop to the guides.

27. A tier according to claim 20 together with free end clamps coacting with the lays of the respective free ends.

28. A tier according to claim 20 in which a lay arm operated free end clamp coacts with the lay made by the lay arm.

29. A tier according to claim 20 in which free end drag clamps occupy positions in the planes of the respective lays, which positions are between the uppermost free end supports and the wrapping means whereby they impose a drag upon the wrapping.

References Cited in the file of this patent

UNITED STATES PATENTS

| | | |
|---|---|---|
| 2,143,748 | Webster et al. | Jan. 10, 1939 |
| 2,402,609 | Brabander | June 25, 1946 |
| 2,518,687 | Harvey | Aug. 15, 1950 |